(12) United States Patent
Leung et al.

(10) Patent No.: US 11,907,789 B2
(45) Date of Patent: Feb. 20, 2024

(54) CLASP DEVICE FOR WEARABLE

(71) Applicant: Ka Wai Wayne Leung, Los Altos, CA (US)

(72) Inventors: Ka Wai Wayne Leung, Hong Kong (HK); Sing Wai Kwok, Hong Kong (HK)

( * ) Notice: Subject to any disclaimer, the term of this patent is extended or adjusted under 35 U.S.C. 154(b) by 763 days.

(21) Appl. No.: 17/035,126

(22) Filed: Sep. 28, 2020

(65) Prior Publication Data
US 2021/0256342 A1 Aug. 19, 2021

Related U.S. Application Data

(63) Continuation-in-part of application No. 15/781,830, filed as application No. PCT/IB2018/053003 on May 1, 2018, now Pat. No. 10,856,140.

(51) Int. Cl.
*G06Q 20/32* (2012.01)
*G06K 19/077* (2006.01)

(52) U.S. Cl.
CPC ..... *G06K 19/07762* (2013.01); *G06Q 20/321* (2020.05); *G06Q 20/3278* (2013.01)

(58) Field of Classification Search
CPC . G06K 19/07762; Y10T 24/49; Y10T 24/398; Y10T 24/3926
See application file for complete search history.

(56) References Cited

U.S. PATENT DOCUMENTS

| | | | | |
|---|---|---|---|---|
| 2,243,554 | A * | 5/1941 | Epstein | H04M 1/05 248/316.7 |
| 5,497,963 | A * | 3/1996 | Lee | F16L 33/02 24/339 |
| 6,814,486 | B2 * | 11/2004 | Sidoni | G01K 1/143 374/E1.019 |

* cited by examiner

*Primary Examiner* — Robert Sandy
(74) *Attorney, Agent, or Firm* — Propagate IP Limited; Joon Hyuk Imm

(57) ABSTRACT

A clasp device adapted for use with a wearable device including a main portion and at least one resiliently deformable arm extended from the main portion along a curvature and configured to be switchable between a normal state and a deformed state; wherein in the normal state a free end of the deformable arm is separated from an opposed end of the main portion a first distance and configured to form a first cavity or passage with the main portion for receiving or engaging with the wearable device; while in the deformed state the free end of the deformable arm is resiliently deformed to enable it to be separated from the opposed end of the main portion a second distance and configured to form a deformable second cavity or passage with the main portion for enabling insertion or removal of the wearable device into or from the clasp device.

9 Claims, 16 Drawing Sheets

CLASP DEVICE FOR WEARABLE

CROSS REFERENCE OF RELATED APPLICATIONS

The present application is a continuation-in-part of U.S. application Ser. No. 15/781,830, filed on May 1, 2018, claiming priorities to PCT Applications No. PCT/IB2018/050802 and No. PCT/IB2018/050803, both filed on Feb. 9, 2018, each of which is fully incorporated herein by reference in its entirety.

STATEMENT OF NO NEW MATTER

This supplemental specification contains no new matter.

TECHNICAL FIELD

The present disclosure relates to a clasp device preferably adapted for mobile secure payments or data transactions, and more particularly to a clasp device adapted for use with or converting a wearable into a smart wearable for conducting wireless secure payment and/or data transaction, comprising an universal passive provisioning unit (UPPU) for secure element for enabling and implementing an active and passive hybrid device for secure contactless or wireless data application/operation/communication.

BACKGROUND ART

The smart mobile devices, such as smartwatches, adopted by the contactless payment systems utilizing a secure element generally comprise a contactless active payment unit or module needs to be powered by an embedded powerful battery thereof. However, quite a few people do not want to buy or use any new smartwatch or smart wearables requiring relatively frequent recharging or battery replacement and prefer use or reuse of their traditional existing watches or wearables for various reasons. Moreover, it is desirable that the existing secure element for smart mobile devices could be also adapted for use in other kinds of contactless secure data transaction/communication system apart from the contactless payment system.

BRIEF SUMMARY OF INVENTION

The present disclosure relates to a clasp device, preferably adapted for use with a wearable device, comprising a main portion, preferably configured to be resiliently bendable and/or deformable in its height direction, length direction, and/or width direction, and at least one resiliently bendable and/or deformable arm or end extended from the main portion along a curvature and configured to be switchable between a normal state and a deformed state; wherein in the normal state a free end of the deformable arm/end is separated from an opposed end of the main portion a first distance and configured to form a first cavity or passage with the main portion for receiving/locking or engaging with an external wearable device (preferably an engageable portion of an associated wearable device) and mounting the clasp device in place (and preferably on the wearable device, including a watch and a bracelet); while in the deformed state the free end of the deformable arm/end is resiliently deformed to enable it to be separated from the opposed end of the main portion a second distance relative large in magnitude than the first distance and configured to form (preferably by expanding temporarily the first cavity or passage into to) a deformable second cavity or passage, having an enlarged dimension than the first cavity or passage, with the main portion for enabling insertion or removal of the external wearable device (preferably the engageable portion of the associated wearable device) into or from the first cavity or passage.

In some embodiments, the claps device comprises a battery-less active and passive hybrid device for secure wireless data transaction comprising a secure element adapted for storing at least one secure applet and at least one data segment for secure contactless data transaction and operatively connected with an active operation unit and a passive operation unit; and preferably the active operation unit is adapted to be connected removably with the secure element; and wherein the hybrid device is configured to be switchable between an active state in which the active operation unit is activated on demand to enable the hybrid device to function as an active device and adapted for provisioning one or more personalization information data, biometric data, health data, government related security data, hardware specific data, and/or a token of the device to the secure element; and a passive state in which the active operation unit is deactivated and the passive operation unit is activated/configured to enable the hybrid device to function as a passive device and adapted for conducting data verification and/or contactless data transaction operation via the secure element. In some embodiments, it further comprises a biometric unit operably connected with the hybrid device for biometric authentication comprising a MCU connected with one or more biometric readers/sensors for reading, writing, storing, and/or processing biometric data related to fingerprint, palm/finger vein pattern, voice pattern, face recognition, DNA, palm print, hand geometry, iris recognition, and/or retina; and preferably it further comprises a battery unit, a power switch unit, and a visual and/or audible indicator unit operably connected with each other and further connected with the biometric unit respectively; wherein the battery unit is configured to power the biometric unit once activated via the power switch unit to enable manipulation of biometric data and data communication among the biometric unit and the hybrid device, particularly the secure element, for conducting predetermined operations for payment, access and digital authentication; wherein the biometric unit is configured to collect a biometric data from the biometric readers/sensors and compare it with a pre-stored user identity/specific biometric data to generate a result of comparison and to determine whether the secure element needs to be operated for conducting secure payment or data transactions and to control an output of the visual and/or audible indicator unit to provide a proper or corresponding visual and/or audible indication for the result of comparison and/or latest status of secure payment or data transactions. As the clasp device is compact in size and activated on demand, it can be incorporated with a traditional timepiece or the like for provision of contactless payment capability.

In several embodiments, the clasp device comprises the main portion and a plurality of resiliently bendable and/or deformable arms or ends extended from the main portion along a curvature and each of them being configured to be switchable between a normal state and a deformed state; wherein in the normal state the free end of respective deformable arms/ends are opposed to and separated from each other a first distance and configured to form a first cavity or passage with the main portion for receiving/locking or engaging with an external wearable device, preferably at least one engageable portion of an associated wearable device, and mounting the clasp device in place, and preferably on a wearable device, including a watch and a bracelet, to convert the wearable device into a smart wearable device capable of performing secure data transaction and/or wireless secure payment; while in the deformed state the free end of at least one of the deformable arms/ends is deformed to enable it to be opposed to and separated from another one of the deformable arms/ends a second distance and configured to form, preferably by expanding temporarily the first cavity or passage into to, a deformable second cavity or passage with the main portion for enabling insertion or removal of the external wearable device, preferably the engageable portion of the associated wearable device, into or from the clasp device.

In other embodiments, the main portion is configured to be preferably an elongated and curved member having a first internal/external curvature in its length direction and a second internal/external curvature in its width direction, wherein the first and second internal curvatures are configured to form collectively an internal surface adapted for conforming with an outer profile of an associated wearable device to be mounted to facilitate proper mounting of the apparatus over the wearable device; and the first and second external curvatures are configured to form collectively an external surface adapted for incorporating/providing a data access region/zone over a secure element received therein for facilitating a wireless data sensing operation of and/or a data exchanging operation with an external associated device/terminal to enable a proper interaction between the wearable device and the associated device/terminal.

In further embodiments, the deformable arm or end is arranged on or integrated with a clasp portion connected or integrated with the main portion, wherein the clasp portion is preferably an elongated and curved member having a first internal/external curvature in its length direction orthogonal to the width direction of the main portion and a second internal/external curvature in its width direction orthogonal to the length direction of the main portion, wherein the first and second internal curvatures are configured to form collectively an internal surface adapted for conforming with an outer profile of the wearable device to facilitate proper mounting of the clasp device over the wearable device; and the first and second external curvatures are configured to form collectively an external surface adapted for facilitating a proper mounting of the clasp device over the wearable device.

In some embodiments, the clasp portion has a substantially c-shaped sectional shape in a plane perpendicular to a length direction of the clasp device.

In other embodiments, the clasp portion comprises two opposed deformable ends extended in a curved direction or along the first internal/external curvature substantially in its length direction from a distal side to a proximal side of the clasp device to form a cavity for receiving an elongated portion of the wearable device to facilitate proper mounting of the apparatus over the wearable device.

In several other embodiments, the deformable end is configured to be switchable between a contracted state in which the clasp portion has a shortest length and is adapted for coupling or engaging with a wearable device and an expanded state in which the clasp portion has a longest length and is adapted for decoupling or disengaging from the wearable device.

In further embodiments, the main portion and the clasp portion collectively has a substantially c-shaped sectional shape in a plane perpendicular to a length direction of the clasp device to facilitate proper mounting of the apparatus over the wearable device.

In still further embodiments, the main portion, the clasp portion, and/or the deformable arm/end comprise an inner layer made of a selected deformable material having a desirable flexibility and durability including 65 manganese steel preferably formed by stamping, and/or an outer layer made of a selected deformable material having a desirable flexibility and durability including thermoplastic polyurethanes preferably formed by injection.

The present disclosure also relates to a method for providing contactless data transaction capabilities to a traditional wearable device by a clasp device including a batteryless active and passive hybrid device for secure wireless data transaction comprising a secure element adapted for storing at least one secure applet and at least one data segment for secure contactless data transaction and operatively connected with a biometric unit, an active operation unit, preferably adapted to be connected removably with the secure element, and a passive operation unit, comprising steps of: mounting or embedding the clasp device at or with the traditional wearable device; switching or setting the hybrid device to an active state by having the active operation unit activated on demand to enable the hybrid device to function as an active device and the secure element provisioned with one or more personalization information data, biometric data, health data, government related security data, hardware specific identification data, and/or a token of the device; and switching or setting the hybrid device to a passive state by having the active operation unit deactivated and the passive operation unit activated/configured to enable the hybrid device to function as a passive device and the secure element configured for conducting data verification and/or contactless data transaction operation via the secure element; and further comprising steps of: enrolling a first biometric data, related to fingerprint, palm/finger vein pattern, voice pattern, face recognition, DNA, palm print, hand geometry, iris recognition, and/or retina, into the biometric unit operably connected with the hybrid device, and particularly the secure element before or after mounting or embedding the clasp device at or with the traditional wearable device; and acquiring a second biometric data and compare it with the first biometric data for effecting a biometric authentication via the biometric unit to determine validity of proceeding further before conducting data verification and/or contactless data transaction operation via the secure element.

In some embodiments, while in the active state the active operation unit is activated by operatively coupled with and powered by a power transfer unit for conducting wireless data communication with a provisioning unit, preferably a smartphone, for provisioning of the personalization information data, biometric data, health data, government related security data, hardware specific data, and/or the token of the device to the secure element from the provisioning unit. The employment of the active operation unit enables the user to make use of other cards or secure applications by provisioning the personalization information of new payment card or other secure data or applets to the secure element.

In some other embodiments, while in the passive state the passive operation unit is activated by operatively coupled with and wirelessly powered by a data transaction unit, preferably a data transaction terminal, for conducting data verification and/or contactless data transaction operation with the data transaction unit via the secure element.

In some embodiments of the hybrid device according to the present disclosure, the active operation unit comprises a first wireless communication unit adapted for coupling and conducting wireless data communication with the provisioning unit, and operatively coupled with a power receiver unit and/or a transient power storage unit, preferably a supercap, adapted for receiving and/or storing power from the coupled power transfer unit. In some embodiments, the transient power storage unit is omitted, though the incorporation of the optional transient power storage unit might enable the hybrid device to be operated continuously as an active device for a period of time when the power transfer unit is decoupled with the active operation unit, which might be desirable to some specific applications.

In some embodiments, the first wireless communication unit is a WIFI, BT, and/or NFC enabled communication unit, and preferably a BLE unit with contacts, preferably waterproof and/or exposed contacts. Preferably, the power transfer unit is a USB power transmitter, preferably equipped with connection members, preferably connection pins or hooks, and/or fixing or locking members for making contact and/or interlocking with the contacts of the BLE unit.

In some embodiments, the passive operation unit comprises a second wireless communication unit, preferably a NFC enabled communication unit, adapted for coupling and conducting wireless data communication with the data transaction unit and operatively coupled with an antenna unit for receiving its operating power and data transaction data and signals from the coupled data transaction unit.

In some embodiments, the second wireless communication unit is a NFC enabled communication unit, and preferably a NFC passive target unit draw its operating power from the data transaction unit acting as a NFC initiator unit. Preferably, the antenna unit comprises an antenna of a dimension adapted to draw operating power directly from a data signal generated from the data transaction unit without a need for amplifying the data signal.

In some embodiments, the secure element, the active operation unit, and the passive operation unit are configured to be operatively coupled with each other and mounted on a battery-less bendable board adapted for easy mounting on a non-planar or a curved surface or being readily insertable or embedded into a curved accommodating space; or the active operation unit is adapted to be removably connected with the secure element and/or integrated with the power transfer unit.

In some embodiments, the active operation unit is integrated with a power transfer or receiver unit and/or an interface for power transfer to form an universal passive provisioning unit for secure element being substantially in form of a clip/clamp or a forepart of clothes-pin and comprising a lower part with a flattened portion located at its proximal end and a depressed portion at its distal end on which a plurality of connection members are arranged for enabling power and signal transmission; and an upper part hingeably mounted over the lower part to be switchable between an opened position/state in which its proximal end is configured to make contact with the proximal end of the lower part and its distal end is configured to disengage with the distal end of the lower part to make the connection members and depressed portion accessible and a closed position/state in which its distal end is configured to make contact with the distal end of the lower part and its proximal end is configured to disengage with the proximal end of the lower part to make the connection members and depressed portion covered and concealed by the upper part.

The present disclosure further relates to a wearable device, including a watch band, a timepiece, a wristband, a key fob, a power bank, and the like, comprising a foregoing clasp device. The clasp device provided by the present disclosure is simple in structure, reasonable in design, high in comfort and low in cost, such that it enables a proper integration with a traditional wearable device and the provision of a versatile wearable device for secure wireless payment and secure wireless data transaction/communication.

BRIEF DESCRIPTION OF DRAWINGS

The present disclosure will be described in details below with reference to the accompanying drawings, in which:

FIG. 11b is a block diagram of the biometric enabled wireless secure payment and/or data transaction apparatus of FIG. 11a;

DETAILED DESCRIPTION OF INVENTION

Figure 1:
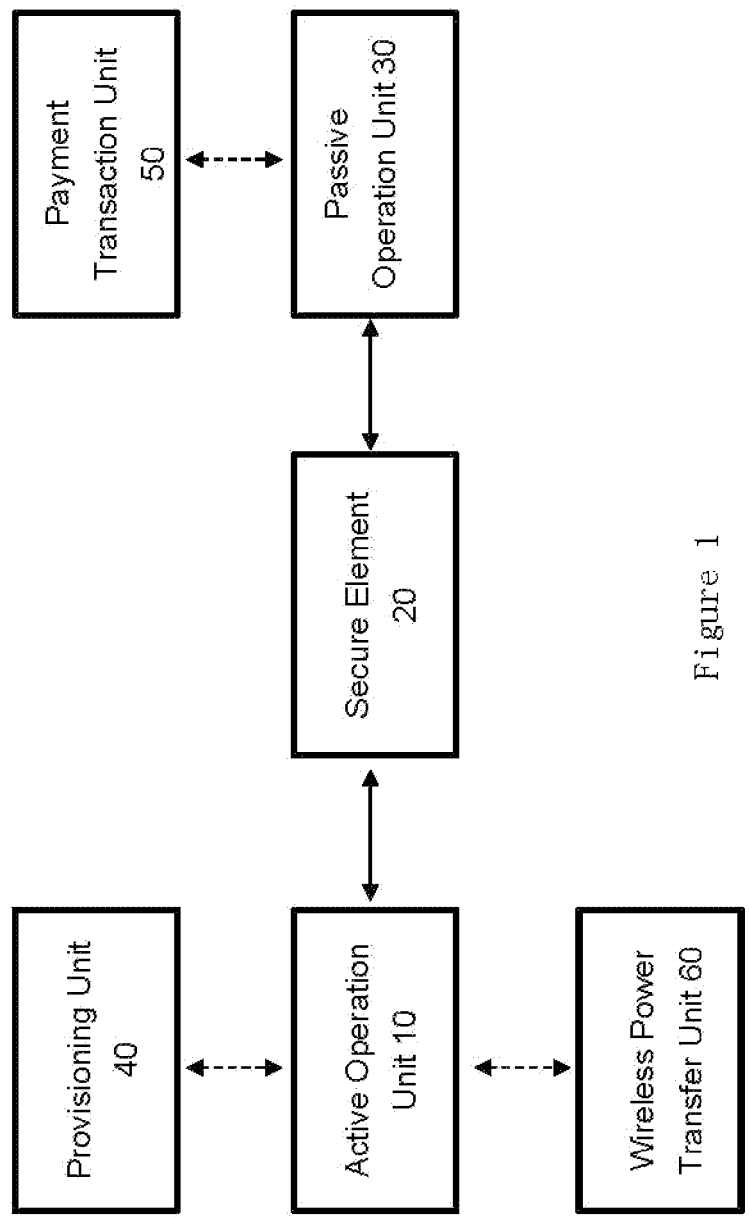
FIG. 1 is a block diagram of a battery-less active and passive hybrid device according to a preferred embodiment of the present disclosure.

The present disclosure will now be described in further details with reference to the accompanying drawings and embodiments, so as to make the objects, technical solutions and advantages of the present disclosure more apparent.

The present disclosure relates to devices and methods for use with EMVCo payment applets provisioning processes on secure element residing on a battery-less and bendable active board environment. The respective terms "EMVCo" or "EMV" means a consortium of Europay, MasterCard, Visa and others, "SE" means a secure element, "NFC" means Near Field Communications or relevant protocols, "BLE" means Bluetooth low energy or the like, and "Payment Applets" means contactless applications residing in SE.

Further, the term "Bendable Active Board" means a platform of bendable nature that consists of a SE for storing secure payment applets and tokens; a Bluetooth module for communications with paired devices; an NFC inductance antenna to receive power from NFC point of sale terminal in turn powering the SE; a wireless interface to receive power from an external source to enable the Bluetooth module on demand.

The respective terms "API" means application programming interface; "PAN" means a payment card primary account number; "Token" means a surrogate replacing the PAN, "Token services" means API offerings from payment network schemes not limited to Visa and Mastercard, where the primary functions are to exchange payment card PANs with surrogates as well as the management of such payment accounts; "Token Band" means an active or passive wearable device or strap/band capable of storing payment token; 'Token Dock" means a standalone power source docking system capable of transferring power wirelessly to the Token Band; "Basic Wearable" means wearable that do not support loading of third party applications; and "Smart Wearable" means wearable that can support loading of third party applications; and "biometric unit" means a hardware component that is capable of reading, writing, storing, and/or processing biometric data, such as a cardholder thumb or finger print, or the like; and "CD-CVM" means consumer device cardholder verification method; and "biometric enabled secure applet" means an application residing in SE adapted for and capable of conducting biometric data processing and secure payment and data transactions as required.

In addition, the term "passive provisioning unit", "passive data provisioning unit", or the term "active operation unit" used herein means a passive or battery-less device or component capable of enabling an apparatus comprising a secure element, with which it operatively connected, coupled, or cooperated, to function as an active device on demand and adapted for provisioning one or more personalization information data, biometric data, health data, government related security data, hardware specific data, and/or a token of the apparatus/device to the secure element in electric and/or signal connection therewith; and the term "passive operation unit" means a passive or battery-less device or component capable of enabling the apparatus with which it operatively connected, coupled, or cooperated to function as a passive device on demand and adapted for conducting data verification and/or contactless data transaction operation, such as payment transaction operation, via the secure element.

According to the present disclosure, nowadays it is a standard practice for cardholders to authenticate themselves at the point of sale; especially for high value payment transactions (ie. PIN entered for EMVCo plastic cards). The cardholder authentication process in a card present environment increases trust and reduces fraud for all participants in the 4-party model. As the world shifts into the digital space and with the abundance of new and advance device form factors, biometrics are becoming popular alternatives to PIN and password for authentication purposes (ie. Thumbprint, ultrasonic sound wave, heartbeat signature etc.). The technical solution of the present disclosure as described below is unique whereby the biometric provisioning and payment authentication process could be performed on a traditional or basic wearable device without the need of an integrated battery source. The captured digital biometric data are fully encrypted and also never leaves the SE residing on the wearable.

Referring to FIG. 1, a block diagram of a battery-less active and passive hybrid device according to a preferred embodiment of the present disclosure is illustrated, according to which the hybrid device for secure wireless payment comprises a secure element 20 adapted for storing at least one secure payment applet and at least one token for secure contactless payment and operatively connected with a passive data provisioning unit/an active operation unit 10 and a passive operation unit 30.

The hybrid device is configured to be switchable between an active state and a passive state in response to the working requirements and conditions for various operations as required. In the active state, the active operation unit 10 is activated and powered preferably wirelessly on demand, e.g., by an external power source or initiator/activator, to enable the hybrid device to function as an active device, and it is adapted for various operations requiring a relatively high and stable power consumption, among other, the operations for provisioning a personalization information of a payment card and/or a payment token of the device to the secure element. In this regard, the active operation unit enables the hybrid device to support installing and loading of third party applications by the end user.

In the passive state, the active operation unit is deactivated, and/or decoupled with external initiator, and the passive operation unit is activated to enable the hybrid device to function as a passive device and adapted for various operations requiring a relatively low or transient power consumption, among other, conducting payment token verification and/or contactless payment transaction operation via the secure element, wherein the low or transient operating power could be drawn from a predetermined matching device adapted for working with a passive device.

In some embodiments such as the embodiment as shown in the FIG. 1, while in the active state the active operation unit 10 is activated by operatively coupled with and powered wirelessly by a wireless power transfer unit 60 for conducting wireless data communication with a provisioning unit, such as a dedicated machine, or a computer, a smart or mobile device comes with a dedicated module for provisioning data to the secure element 20, whereby enabling the provisioning of the personalization information of the payment card and/or the payment token of the device to the secure element from the provisioning unit.

In some embodiment such as the embodiment as shown in the FIG. 1, while in the passive state the passive operation unit 30 is activated by operatively coupled with and wirelessly powered by a payment transaction unit 50, such as a dedicated machine terminal, or a computer, a smart or mobile device comes with a dedicated module for contactless payment transaction with the secure element 20, whereby enabling the conducting of payment token verification and/or contactless payment transaction operation with the payment transaction unit via the secure element.

In some embodiments, the active operation unit comprises a first wireless communication unit adapted for coupling and conducting wireless data communication with the personalization information and payment token provisioning unit. The first wireless communication unit is operatively coupled with a wireless power receiver unit and/or a transient power storage unit, preferably a supercap, adapted for receiving and/or storing power from the coupled wireless power transfer unit, so as to enable the completion of routine and specific operations of the hybrid device requiring a relatively high and stable operating power.

In some embodiments, the first wireless communication unit is a WIFI, BLE, and/or NFC enabled communication unit.

In some embodiments, the passive operation unit comprises a second wireless communication unit, adapted for coupling and conducting wireless data communication with the payment transaction unit and operatively coupled with an antenna unit for receiving its operating power and payment transaction data and signals from the coupled payment transaction unit.

In some embodiments, the second wireless communication unit is a NFC enabled communication unit acting as a NFC passive target unit configured to draw its operating power from the payment transaction unit acting as a NFC initiator unit.

In other embodiments, the first and second wireless communication unit are both or the same NFC enabled communication unit, namely the first wireless communication unit and the provisioning unit are both active mode NFC communication unit, as NFC devices can work in peer-to-peer mode, which enables two active mode NFC-enabled devices to communicate with each other to exchange information in an adhoc fashion, wherein one of the devices will deactivate its RF field while it is waiting for data.

In some embodiments, the antenna unit comprises an antenna of a dimension of 10×24 mm. The dimension is desirable for conducting stable and reliable data communication with the payment transaction unit without the need of incorporating an antenna booster to ensure proper operations of the passive operation unit, as could be found in some prior art devices using a relatively small or miniature antenna. If the dimension of the antenna is relative large, then the hybrid device could not entirely fit into some traditional wearable devices, such as a traditional watch and jewellery.

In some embodiments, the secure element, the active operation unit, and the passive operation unit are configured to be operatively coupled with each other and mounted on a bendable board adapted for easy mounting on a non-planar or a curved surface or being readily insertable or embedded into a curved accommodating space.

Figure 2:
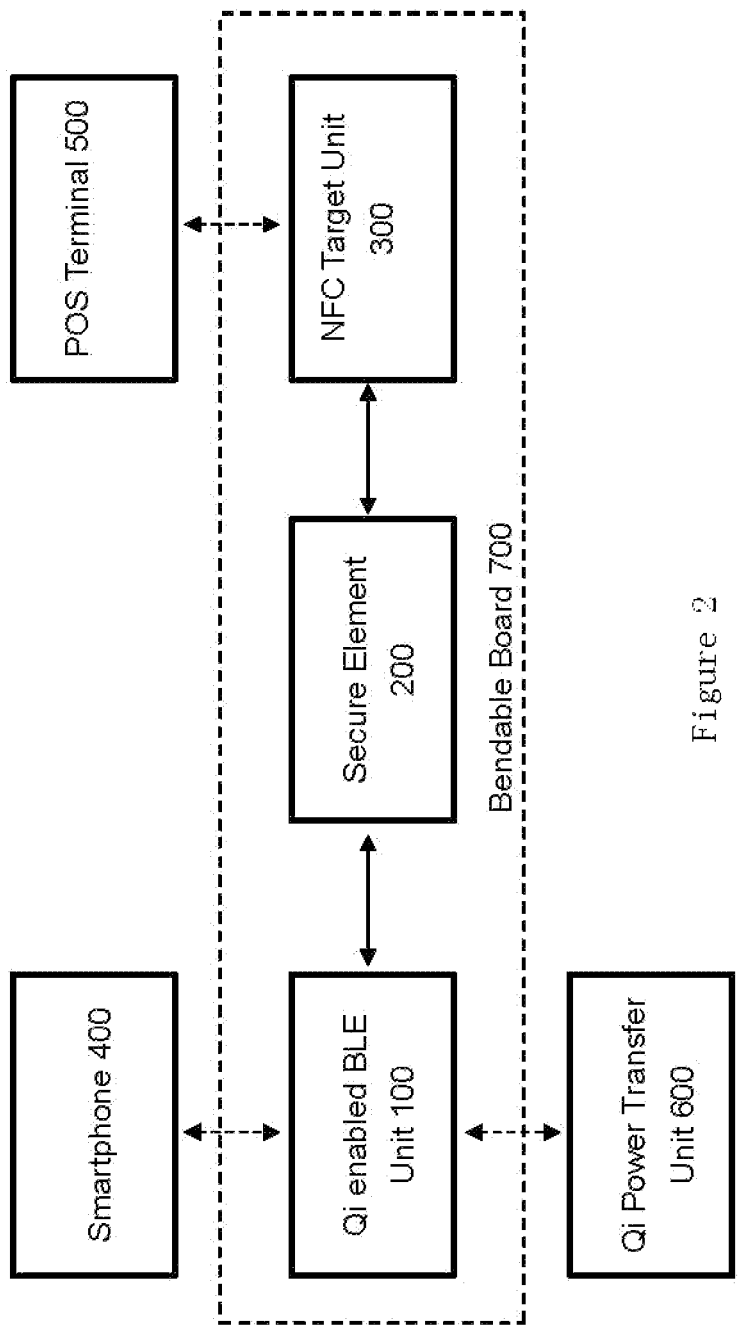
FIG. 2 is a block diagram of a battery-less active and passive hybrid device according to another preferred embodiment of the present disclosure.

Now referring to FIG. 2, a block diagram of a battery-less active and passive hybrid device according to another preferred embodiment of the present disclosure is illustrated, according to which the hybrid device for secure wireless payment comprises a secure element 200 adapted for storing at least one secure payment applet and at least one token for secure contactless payment and operatively connected with a Qi and BLE enabled active operation unit and a NFC enabled passive operation unit.

In some embodiments such as the embodiment as shown in the FIG. 2, the active operation unit is a Qi enabled BLE unit 100 comprising a Qi standard power receiver and the wireless power transfer unit is a Qi enabled power transfer unit 600 comprising a Qi standard power transmitter for providing wirelessly the power to the BLE unit for conducting wireless data communication with a provisioning unit, namely a smartphone 400 as shown in the FIG. 2. The passive operation unit is a NFC passive target unit 300 operatively coupled with and wirelessly powered by a payment transaction unit, namely a POS terminal 500, and configured to draw its operating power from the payment transaction unit acting as a NFC initiator unit for conducting payment token verification and/or contactless payment transaction operation with the payment transaction unit via the secure element 200.

Further, in the hybrid device as shown in FIG. 2, the secure element 200, the Qi enabled BLE unit 100, and the NFC passive target unit 300 are operatively coupled with each other and mounted on a bendable board 700 adapted for easy mounting on a non-planar or a curved surface and/or being readily insertable or embedded into a curved accommodating space.

In some embodiments, the hybrid device is mounted at and preferably embedded into a band or buckle of a traditional watch to replace the original band or buckle of the watch of a user for conducting contactless payment transactions and other applicable operations, such that the user could wear and use the watch in a traditional way while benefit from the contactless payment capabilities provided by the new and replaceable part of the watch.

Traditional watches are composed of mostly mechanical components and metal materials for the casing attached to a band or wrist strap. The wrist strap also can be produced in a variety of materials including leather, plastic, metals etc. Adding smart features such as payment applets on this segment of wearable under normal circumstances require a battery source to enable communications with external devices such as a smart phone.

The challenges or issues with adding an integrated battery source to a traditional wearable product are as follows:
  design and aesthetic issue, wherein the battery is rigid and the placement can take up space adding unnecessary thickness impacting aesthetic and designs;
  battery recharging issue, wherein the recurring use of a rechargeable battery requires added components and interface such as cable attachment to the device impacting aesthetics and productions costs of the final product;
  battery replacement issue, wherein all battery has a limited lifespan which needs replacement, whether or not the battery is rechargeable; and
  water resistant issue, wherein enclosure of battery and recharging cable interface can limit the water resistant ability of the overall device.

Accordingly, the technical solutions set forth by the present disclosure could apparently solve the foregoing technical problems for providing power to traditional and basic wearable product (including but not limited to, timepiece and jewellery) on demand while removing the dependency and need of an integrated battery. The present disclosure combines a bendable board enabling a unique payment token provisioning sequence to add NFC payment capabilities on traditional and basic wearable products without the need of an integrated battery source. The ability to decouple the battery from the wearable while having the ability to enable communications with smart devices through Bluetooth or similar technology is critical in overcoming all of foregoing challenges or issues in the prior art.

Figure 3:
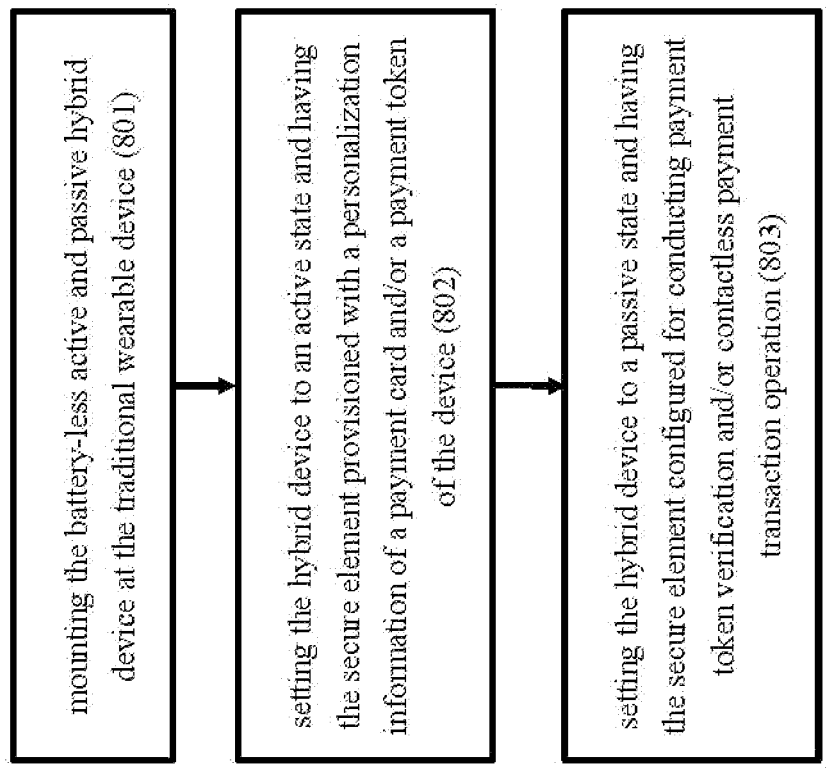
FIG. 3 is a flow chart of a method for providing contactless payment capabilities to a traditional wearable device by a battery-less active and passive hybrid device according to a further preferred embodiment of the present disclosure.

Referring to FIG. 3, which illustrates a flow chart for a method for providing contactless payment capabilities to a traditional wearable device by a battery-less active and passive hybrid device for secure wireless payment comprising a secure element adapted for storing at least one secure payment applet and at least one token for secure contactless payment and operatively connected with a passive data provisioning unit/an active operation unit and a passive operation unit, comprising steps of:

mounting/embedding the battery-less active and passive hybrid device at/into the traditional wearable device (801);

switching/setting the hybrid device to an active state and having the secure element provisioned with a personalization information of a payment card and/or a payment token of the device (802); and switching/setting the hybrid device to a passive state and having the secure element configured for conducting payment token verification and/or contactless payment transaction operation (803).

In some embodiments, the foregoing method comprises one or more of the following optional steps of:

incorporating a biometric unit comprising one or more biometric sensors (as will be described below in further details) with the hybrid device before mounting it into the traditional wearable device and enrolling one or more biometric data into the biometric unit (804);

pairing up the hybrid device and a mobile device preferably via BLE for receiving one or more additional personalization information (of one or more payment cards, for example) and/or one or more additional payment tokens from the mobile device for conducting one or more additional provisioning operations with the secure element and selecting or setting a default personalization information and/or a default payment token (805); and/or activating/employing the biometric unit incorporated with the hybrid device for effecting a secondary authentication for conducting secure element provisioning process, payment token verification, and/or contactless payment transaction operation (806).

In some embodiments, a method for providing contactless payment capabilities to a traditional wearable device comprises the steps of:

mounting/embedding the battery-less active and passive hybrid device at/into the traditional wearable device;

switching/setting the hybrid device to an active state by having the active operation unit activated wirelessly, or by an engageable and decoupleable or removably/decoupleably connected external power transfer unit, on demand to enable the hybrid device to function as an active device and the secure element provisioned with a personalization information of a payment card and/or a payment token of the device; and switching/setting the hybrid device to a passive state by having the active operation unit deactivated wirelessly, or by disengaging/decoupleabling with the external power transfer unit, on demand and the passive operation unit activated/configured to enable the hybrid device to function as a passive device and the secure element configured for conducting payment token verification and/or contactless payment transaction operation.

According to another aspect of the present disclosure, which provides a provisioning process flow for a battery-less active and passive hybrid device for secure wireless payment comprising a secure element adapted for storing at least one secure payment applet and at least one token for secure contactless payment as follows:

Step 1: Place the token band or the hybrid device with the secure element on top of an activated or powered token dock to receive wirelessly power from the token dock to power its BLE unit.

Step 2: Start a mobile application on a smartphone or mobile device and complete the standard BLE pairing with the token band to initiate token services provisioning request with payment networks.

Step 3: The mobile application subsequently communicates with the SE over global platform standards and completes the personalization of the payment token securely on the SE.

Step 4: Remove the token band from the token dock and place the nonpowered passive token band over an NFC enabled point of sales terminal, which exerts power to an antenna on the token band to communicate with the payment applet and complete a NFC contactless payment transaction with the terminal.

In some embodiments, the hybrid device is further connected and cooperated with a biometric unit and the SE has incorporated a biometric applet, such that the provisioning process flow is biometric enabled and further comprises steps of:

Step 5: The mobile application then advises the cardholder to enroll his/her thumbprint and/or finger print signature by placing his/her finger on and off the biometric reader repeatedly before or after Step 3; wherein the biometric reader is integrated as part of the token band, and during provisioning the partial or full digital signature were never transferred to the smartphone or mobile device.

Step 6: The mobile application prompts the cardholder that the provisioning process is completed and advises the cardholder to remove the token band from the token dock; wherein the thumbprint and/or finger print digital signature is now fully captured, encrypted and resides on the integrated SE as part of the token band.

In other embodiments, the biometric enabled provisioning process flow further comprises steps of:

Step 7: At an NFC enabled point of sale terminal, the cardholder place his/her thumbprint/thumb/finger on the biometric reader as part of the token band when trying to complete a NFC contactless payment transaction with the terminal.

Step 8: The terminal exerts power to the antenna on the bendable active board to communicate with the biometric applet to compute the digital checksum within the SE to authenticate the user.

Step 9: The payment applet sets the Consumer Device Cardholder Verification Method (CD-CVM) (the terminology can differ dependent on payment network partner) flag to "ON" and the payment applet completes the NFC contactless payment transaction adhering to EMV standards with the terminal.

Figure 4:
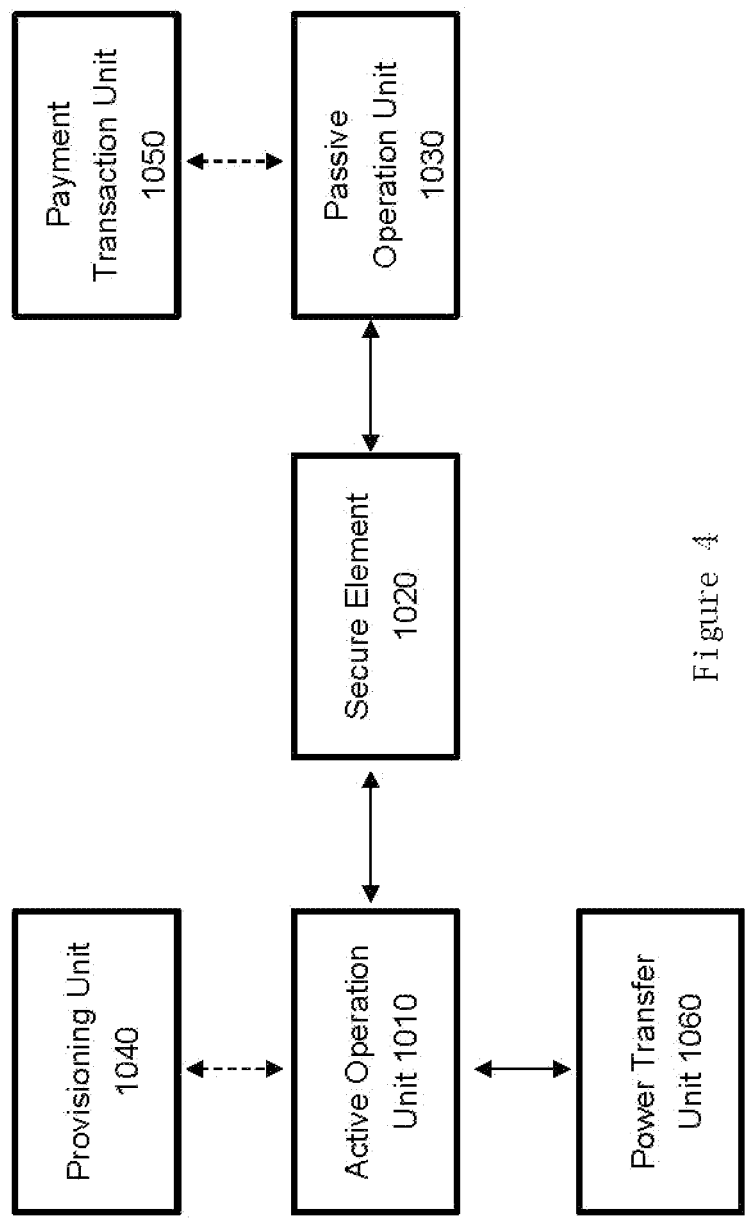
FIG. 4 is a block diagram of a battery-less active and passive hybrid device according to another preferred embodiment of the present disclosure.

Referring to FIG. 4, a block diagram of a battery-less active and passive hybrid device according to a preferred embodiment of the present disclosure is illustrated, according to which the hybrid device for secure wireless payment comprises a secure element 1020 adapted for storing at least one secure payment applet and at least one token for secure contactless payment and operatively connected with a passive data provisioning unit/an active operation unit 1010 and a passive operation unit 1030. The present embodiment and the embodiments as shown in FIG. 1 and FIG. 2 differ in that the active operation unit is preferably adapted to be engageable and decoupleable or connected removably/decoupleably with the secure element. For example, the active operation unit could be integrated with the power transfer unit or an interface for power transfer (such as an USB interface for receiving power from an external USB power source/socket/cable) and/or not to be mounted together nor connected permanently with the secure element and the passive operation unit on the hybrid device/the bendable board.

The hybrid device is configured to be switchable between an active state and a passive state in response to the working requirements and conditions for various operations as required. In the active state, the active operation unit 1010 is activated and powered on demand, e.g, by an external power source, to enable the hybrid device to function as an active device, and it is adapted for various operations requiring a relatively high and stable power consumption, among other, the operations for provisioning a personalization information of a payment card and/or a payment token of the device to the secure element. In this regard, the active operation unit enables the hybrid device to support installing and loading of third party applications to the secure element by the end user.

In the passive state, the active operation unit is deactivated, and/or decoupled with external power source, and the passive operation unit is activated/configured to enable the hybrid device to function as a passive device and adapted for various operations requiring a relatively low or transient power consumption, among other, conducting payment token verification and/or contactless payment transaction operation via the secure element, wherein the low or transient operating power could be drawn from a predetermined matching device adapted for working with a passive device.

In some embodiments such as the embodiment as shown in the FIG. 4, while in the active state the active operation unit 1010 is activated by operatively coupled with and powered by a power transfer unit 1060 for conducting wireless data communication with a provisioning unit, such as a dedicated machine, or a computer, a smart or mobile device comes with a dedicated module for provisioning data to the secure element 1020, whereby enabling the provisioning of the personalization information of the payment card, biometric data, health data, government related security data, hardware specific data, and/or the payment token of the device to the secure element from the provisioning unit.

In some embodiment such as the embodiment as shown in the FIG. 4, while in the passive state the passive operation unit 1030 is activated by operatively coupled with and wirelessly powered by a payment transaction unit 1050, such as a dedicated machine terminal, or a computer, a smart or mobile device comes with a dedicated module for contactless payment transaction with the secure element 1020, whereby enabling the conducting of payment token verification and/or contactless payment transaction operation with the payment transaction unit via the secure element.

In some embodiments, the active operation unit comprises a first wireless communication unit adapted for coupling and conducting wireless data communication with the personalization information and payment token provisioning unit.

The first wireless communication unit is operatively coupled with a power receiver unit and/or a transient power storage unit, preferably a supercap, adapted for receiving and/or storing power from the coupled power transfer unit, so as to enable the completion of routine and specific operations of the hybrid device requiring a relatively high and stable operating power.

In some embodiments, the first wireless communication unit is a WIFI, BT, and/or NFC enabled communication unit, and preferably a BLE unit with a plurality of contacts (and preferably, 2 or 4 contacts), preferably waterproof and/or exposed contacts.

In some embodiments, the passive operation unit comprises a second wireless communication unit, adapted for coupling and conducting wireless data communication with the payment transaction unit and operatively coupled with an antenna unit for receiving its operating power and payment transaction data and signals from the coupled payment transaction unit.

In some embodiments, the second wireless communication unit is a NFC enabled communication unit acting as a NFC passive target unit configured to draw its operating power from the payment transaction unit acting as a NFC initiator unit.

In other embodiments, the first and second wireless communication unit are both or the same NFC enabled communication unit, namely the first wireless communication unit and the provisioning unit are both active mode NFC communication unit, as NFC devices can work in peer-to-peer mode, which enables two active mode NFC-enabled devices to communicate with each other to exchange information in an adhoc fashion, wherein one of the devices will deactivate its RF field while it is waiting for data.

In some embodiments, the antenna unit comprises an antenna of a preferred dimension of 10×30 mm, and more preferably 10×24 mm. The dimension is desirable for conducting stable and reliable data communication with the payment transaction unit without the need of incorporating an antenna booster to ensure proper operations of the passive operation unit, as could be found in some prior art devices using a relatively small or miniature antenna. If the dimension of the antenna is relative large, then the hybrid device might not be entirely fitted into some traditional wearable devices, such as a traditional watch and jewellery worn on wrist, waist, or neck, for example.

In some embodiments, the secure element, the active operation unit, and the passive operation unit are configured to be operatively coupled with each other and mounted on a bendable board adapted for easy mounting on a non-planar or a curved surface or being readily insertable or embedded into a curved accommodating space; or the active operation unit is adapted to be an external standalone unit and removably connected with the secure element and/or integrated with the power transfer unit rather than mounted on the bendable board.

Figure 5:
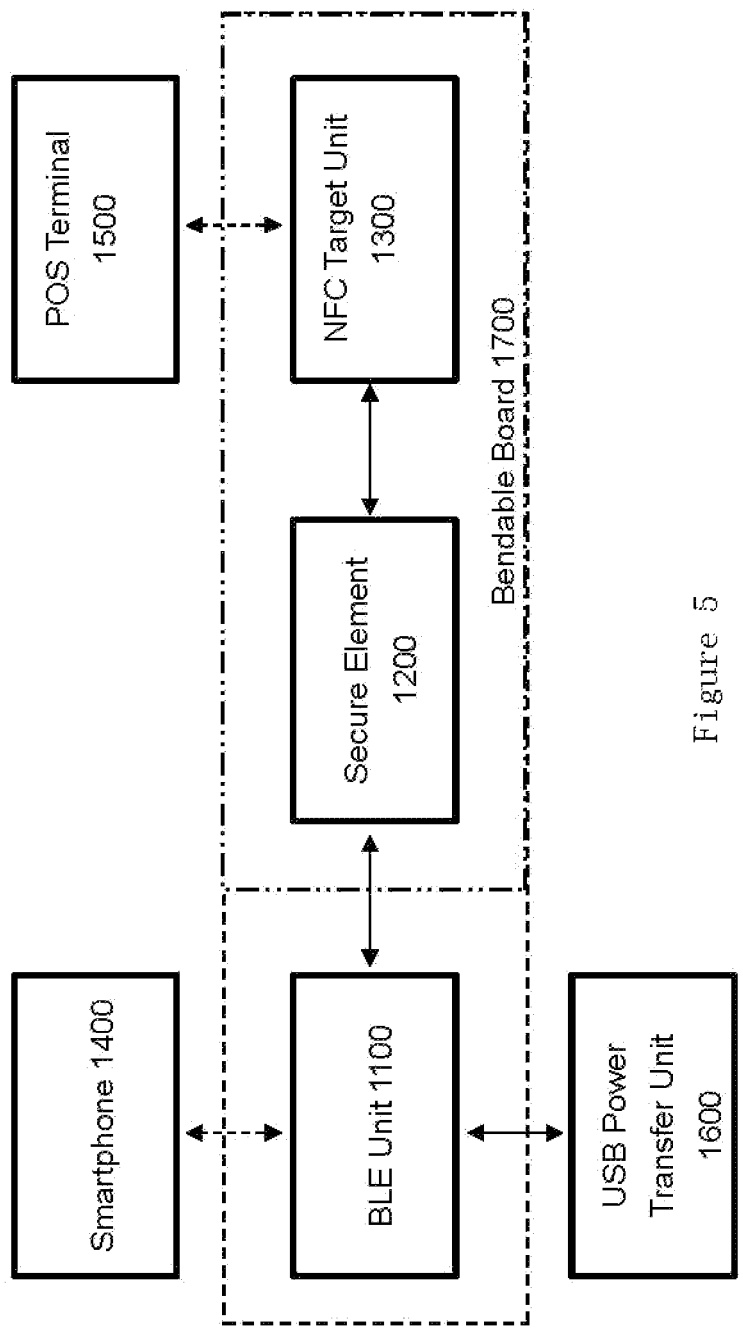
FIG. 5 is a block diagram of a battery-less active and passive hybrid device according to yet still another preferred embodiment of the present disclosure.

Now referring to FIG. 5, a block diagram of a battery-less active and passive hybrid device according to another preferred embodiment of the present disclosure is illustrated, according to which the hybrid device for secure wireless payment comprises a secure element 1200 adapted for storing at least one secure payment applet and at least one token for secure contactless payment and operatively connected with a BLE enabled passive data provisioning unit/active operation unit and a NFC enabled passive operation unit.

In some embodiments such as the embodiment as shown in the FIG. 5, the active operation unit is a BLE unit 1100 comprising a plurality of contacts for receiving power from removably coupled power transmitter and the power transfer unit is a USB power transfer unit 1600 comprising a USB power transmitter, preferably equipped with connection members, such as connection pins or hooks, and/or fixing or locking members for making contact and/or interlocking with the contacts of the BLE unit, whereby providing the power to the BLE unit for conducting wireless data communication with a provisioning unit, namely a smartphone 1400 as shown in the FIG. 5. The passive operation unit is a NFC passive target unit 1300 operatively coupled with and wirelessly powered by a payment transaction unit, namely a POS terminal 1500, and configured to draw its operating power from the payment transaction unit acting as a NFC initiator unit for conducting payment token verification and/or contactless payment transaction operation with the payment transaction unit via the secure element 1200.

Further, in the hybrid device as shown in FIG. 5, the secure element 1200, the BLE unit 1100, and the NFC passive target unit 1300 are operatively coupled with each other and mounted on a bendable board 1700 adapted for easy mounting on a non-planar or a curved surface and/or being readily insertable or embedded into a curved accommodating space. Alternatively, the BLE unit is adapted to be removably connected with the secure element without mounting fixedly on the bendable board; and/or the BLE unit might be integrated with the USB power transfer unit 1600, as will be described in further details below.

In some embodiments, the hybrid device is mounted at and preferably embedded into a band or buckle, preferably made of a non-metal material such as leather or plastic or the like to reduce the interference thereof, of a traditional watch to replace the original band or buckle of the watch of a user for conducting contactless payment transactions and other applicable operations, such that the user could wear and use the watch in a traditional way while benefit from the contactless payment capabilities provided by the new and replaceable part of the watch.

Figure 6:
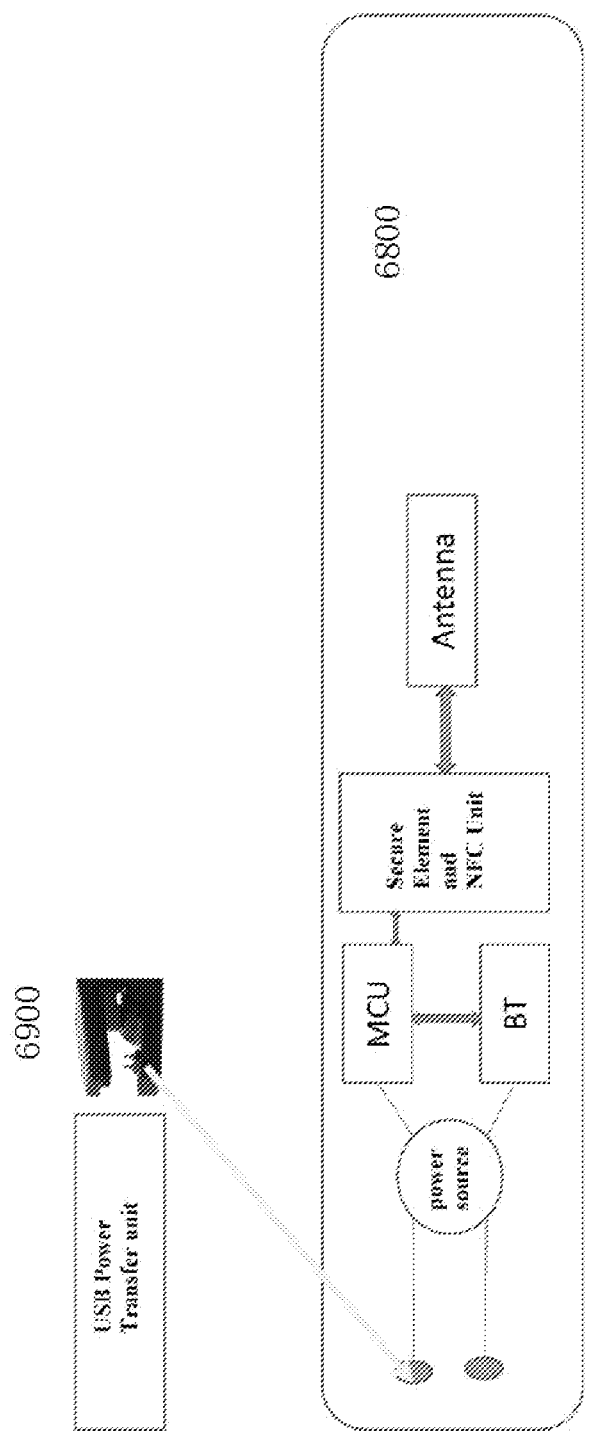
FIG. 6 is a schematic view of a watch band adopting the battery-less active and passive hybrid device according to one preferred embodiment of the present disclosure.

Referring to FIG. 6, a schematic view of a watch band 6800 adopting the battery-less active and passive hybrid device according to one preferred embodiment of the present disclosure is illustrated, wherein the power transfer unit is a USB power transfer unit 6900 substantially in the form of a clip/clamp or a forepart of clothes-pin. The USB power transfer unit comprises an upper part and a lower part on which a plurality of connection pins or hooks extended from the base of the lower part along a longitudinal axis are mounted firmly and adapted to engage with the respective contacts arranged in the watch band. The USB power transfer unit might further comprise at least one fixing or locking members (not shown) for making contact and/or interlocking with the contacts of the BLE unit. The power received through the contacts are used to power or activate directly the active operation unit, or activate an optional internal power source/accumulator (such as a supercap in electric connection with the contacts for receiving and storing power from the coupled USB power transfer unit) of the hybrid device embedded in the watch band for powering the active operation unit, comprising a MCU and BT/BLE unit operatively connected with the secure element and NFC unit. While in the passive state, the antenna of the passive unit will draws its operating power wirelessly from external payment transaction unit for powering the passive operation unit comprising the NFC unit operatively connected with the secure element and the antenna.

Figure 7:
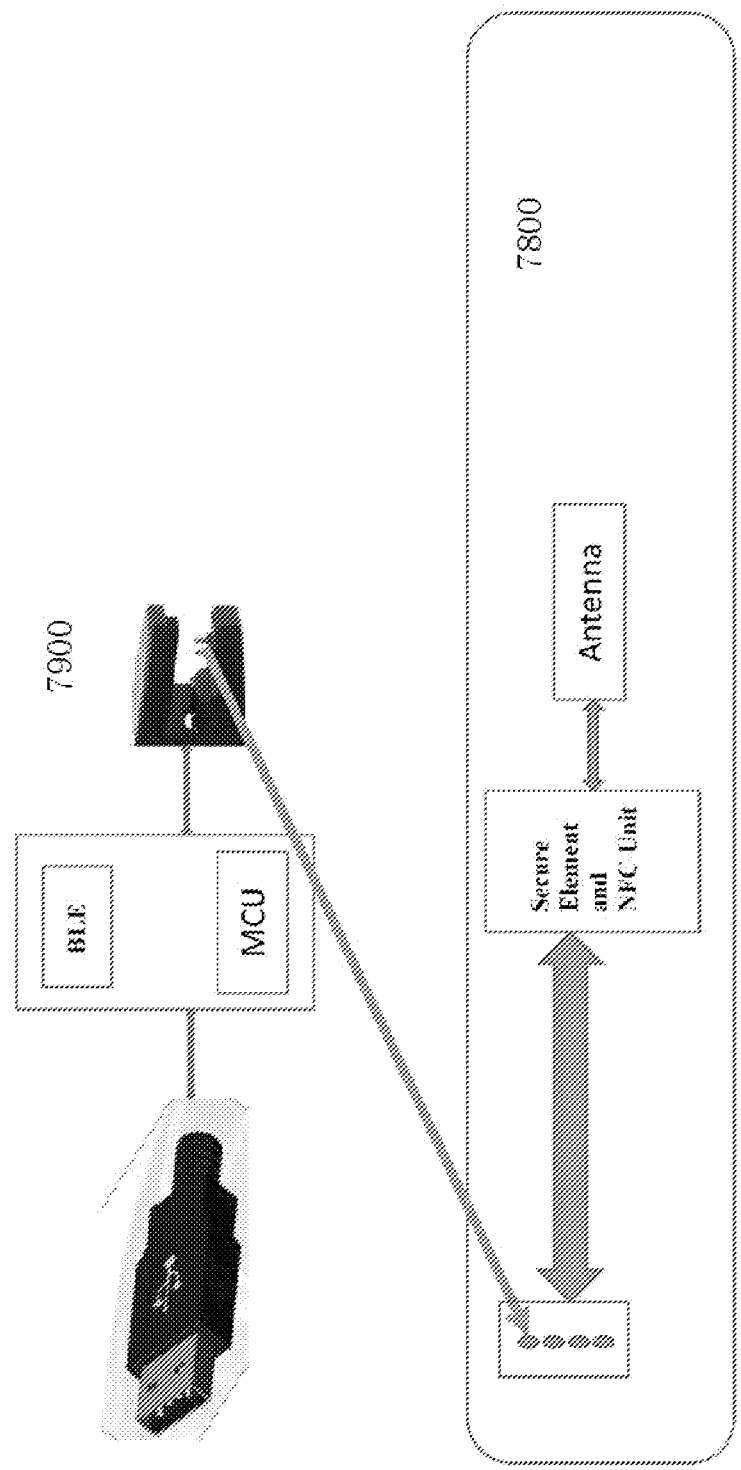
FIG. 7 is a schematic view of a watch band adopting the battery-less active and passive hybrid device according to another preferred embodiment of the present disclosure.

Now referring to FIG. 7, a schematic view of a watch band 7800 adopting the battery-less active and passive hybrid device according to another preferred embodiment of the present disclosure is illustrated, wherein the power transfer unit is a USB power transfer unit 7900 also substantially in the form of a clip/clamp or a forepart of clothes-pin and integrated with the active operation unit comprising the BLE unit and the MCU. In this regard, the active operation unit is removably connected with the secure element and only the secure element and the passive operation unit will be mounted on the bendable board and embedded into the watch band, and such configuration will simplify substantially the layout and design of the hidden or concealed part of the hybrid device being mounted and embedded into the wearable device, such as the watch band.

Similarly, the USB power transfer unit comprises an upper part and a lower part on which a plurality of connection pins or hooks extended from the base of the lower part along a longitudinal axis are mounted firmly and adapted to engage with the respective contacts arranged in the watch band and/or on the bendable board on which the secure element and passive operation unit are mounted. The USB power transfer unit might further comprise at least one fixing or locking members (not shown) for making contact and/or interlocking with the contacts operatively connected with the secure element and the NFC unit. The coupling between the connection pins and the contacts is adapted for provisioning personalization information of a payment card and/or a payment token of the device to the secure element via the external active operation unit. The contacts are adapted for enabling the power transmission and data communication between the external action operation unit and the secure element. In this embodiment, there are four contacts such that data and power signal could be transferred concurrently to facilitate the operation of the active operation unit and the secure element. While in the passive state, the antenna will draws its operating power wirelessly from external payment transaction unit for powering the passive operation unit comprising the NFC unit operatively connected with the secure element and the antenna.

In some embodiments, the watch band and/or the bendable board comprise one or more optional second contacts adapted for provision of additional functions. For example, one of the optional second contacts is a reset contact to enable a warm or cold reboot/reset of the operating system/the kernel of the secure element when necessary. In this regard, the power transfer unit also comprises one or more optional second connection pins or hooks adapted for making electric connection with the respective second contacts for implementation of the relevant additional functions.

Figure 8:
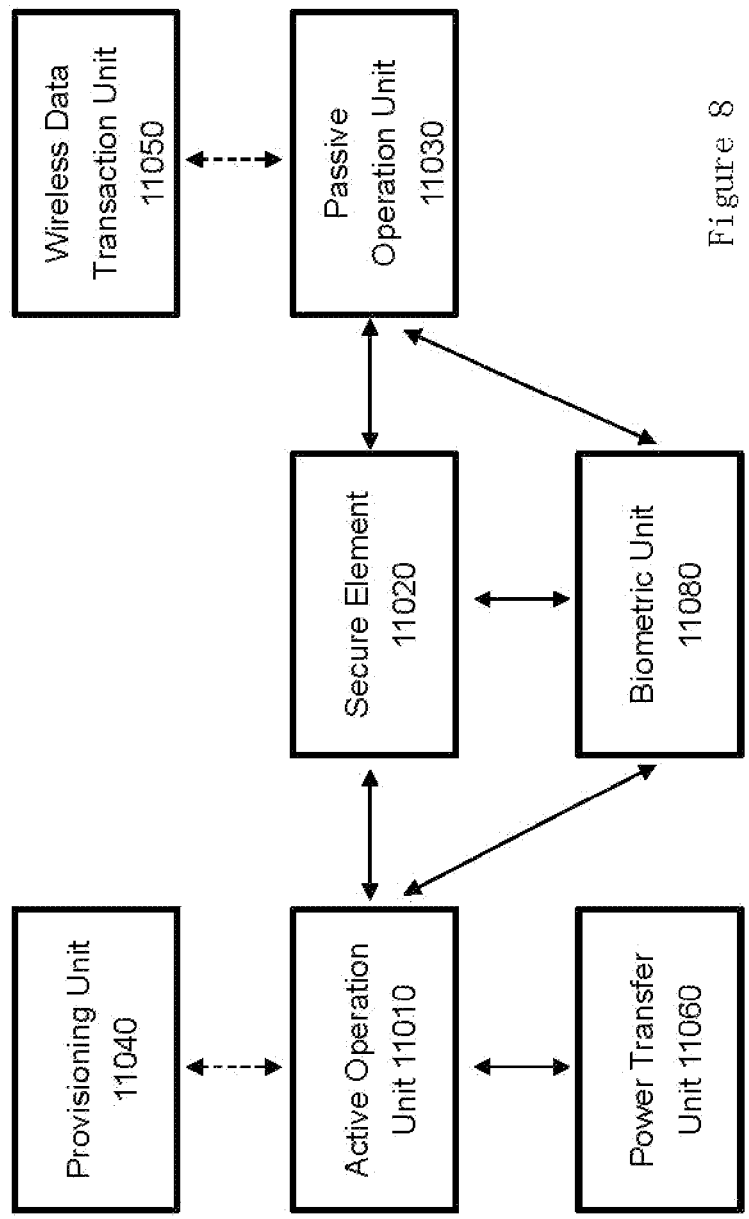
FIG. 8 is a block diagram of a battery-less active and passive hybrid device according to another preferred embodiment of the present disclosure.

Referring to FIG. 8, a block diagram of a battery-less active and passive hybrid device according to a preferred embodiment of the present disclosure is illustrated, according to which the hybrid device adapted for various secure applications/operations/communication comprises a secure element 11020 adapted for storing at least one secure applet for conducting various secure applications/operations and at least one data segment/memory for secure contactless data transaction/exchange and operatively connected with an active operation unit 11010 and a passive operation unit 11030. The present embodiment is similar to the one as shown in FIG. 4 in structural, operational, and functional aspects, while the present embodiment and the embodiments as shown in FIGS. 1-2 and FIGS. 4-5 differ basically in that it further comprise a biometric unit 11080 for secondary or biometric authentication of user identity comprising one or more biometric readers/sensors capable of reading, writing and/or processing biometric data related to one or more of the following items/entries: fingerprint, palm/finger vein pattern, voice pattern, face recognition, DNA, palm print, hand geometry, iris recognition, and/or retina. The biometric unit 11080 is preferably a passive device and operatively connected with the secure element 11020, the active operation unit 11010, and the passive operation unit 11030 as shown in the figure. Definitely and apparently, the biometric unit could be also incorporated by and for use with all of the above embodiments in a similar manner.

Further, the hybrid device of the present embodiment is adapted not only for wireless payment but also for wireless data transaction/communication for use in various secure applications/operations as the secure element operated in active state could be provisioned with not only information of payment card and token for payment transaction, but also biometric data, health data, hardware specific data, and/or Government related security data and the like. In this regard, the hybrid device could be also adapted at least for use with various access control systems, intelligent remote key systems for automobile, medical systems, or the like.

In some embodiments, the hybrid device or the secure element operated in active state is provisioned with personalization information and/or biometric data of authorized user/personnel and a secure applet configured for use with an access control system via the provisioning unit 11040 and active operation unit 11010. In operation, the hybrid device operated in passive state plays the role of an access card or ID badge of the access control system, and the passive operation unit 11030 draws its operating power from a card reader or a dedicated wireless data transaction unit 11050 playing the role of the card reader of the access control system, such that the secure applet is activated to communicate wirelessly with the access control system for verification of user identity whereby opening respective doors controlled by the access control system if the verification result is positive. If a secondary authentication or biometric data is required by the access control system, the secure element or the secure applet operated in passive state receives and/or processes the biometric data of user provided by the biometric unit and forward wirelessly the original or processed biometric data to the access control system to ensure the security thereof.

In some embodiments, the hybrid device or the secure element operated in active state is provisioned with hardware specific data (such as intelligent key data of intelligent key system for one or more automobiles for activation and proper operations of the automobiles) and/or biometric data of authorized person/driver and a secure applet configured for use with the respective intelligent key systems for automobile via the provisioning unit 11040 and active operation unit 11010. In operation, the hybrid device operated in passive state plays the role of an intelligent key or remote controller of the intelligent key system embedded or installed in the automobile, and the passive operation unit 11030 draws its operating power from a key reader or a dedicated wireless data transaction unit 11050 playing the role of the key reader of the intelligent key system of the automobile, such that the secure applet is activated to communicate wirelessly with the key system of the automobile for verification of driver identity whereby activating and operating respective parts controlled by the intelligent key system if the verification result is positive. If a secondary authentication or biometric data is required by the intelligent key system, the secure element or the secure applet operated in passive state receives and/or processes the biometric data of user provided by the biometric unit and forward wirelessly the original or processed biometric data to the intelligent key system to ensure the security and proper operation thereof.

In some embodiments, the hybrid device or the secure element operated in active state is provisioned with health data and/or biometric data of a participant/patient registered with an intelligent medical system and a secure applet configured for use with the medical system via the provisioning unit 11040 and active operation unit 11010. The health data comprises physical condition data, medical history data, historical prescription data of previous treatments or diagnoses, or the like. In operation, the hybrid device operated in passive state plays the role of an intelligent medical card or a smart card for personal identification for the medical system, and the passive operation unit 11030 draws its operating power from a card reader or a dedicated wireless data transaction unit 11050 playing the role of the card reader of the intelligent medical system, such that the secure applet is activated to communicate wirelessly with the intelligent medical system for verification of patient identity whereby enabling the provision and accessing of the medical history or the like by medical staffs of the intelligent medical system if the verification result is positive. If a secondary authentication or biometric data is required by the intelligent medical system, the secure element or the secure applet operated in passive state receives and/or processes the biometric data of the participant/patient provided by the biometric unit and forward wirelessly the original or processed biometric data to the intelligent medical system to ensure the security and proper operation thereof.

In some embodiments, the hybrid device or the secure element operated in active state is provisioned with government related security data and/or biometric data of a citizen or a resident governed by the government and a secure applet configured for use with an intelligent system or a smart city program provided by the government via the provisioning unit 11040 and active operation unit 11010. The government related security data comprises ID card or passport data, immigration or travel record data, contact information data, driving licence data, or the like. In operation, the hybrid device operated in passive state plays the role of an smart ID card for personal identification required by various intelligent systems or services provided by the government, and the passive operation unit 11030 draws its operating power from a card reader or a dedicated wireless data transaction unit 11050 playing the role of the card reader, such that the secure applet is activated to communicate wirelessly with the intelligent system for verification of personal identity whereby enabling the employment and accessing of various intelligent systems or services provided by the government if the verification result is positive. If a secondary authentication or biometric data is required by the intelligent system or services, the secure element or the secure applet operated in passive state receives and/or processes the biometric data of the participant/patient provided by the biometric unit and forward wirelessly the original or processed biometric data to the intelligent system to ensure the security and proper operation thereof.

The hybrid device is configured to be switchable between an active state and a passive state in response to the working requirements and conditions for various operations as required. In the active state, the active operation unit 11010 is activated and powered on demand, e.g, by an external power source, to enable the hybrid device to function as an active device, and it is adapted for various operations requiring a relatively high and stable power consumption, among other, the operations for provisioning one or more personalization information data, biometric data, health data, government related security data, hardware specific identification data and/or a token of the device to the secure element. In this regard, the active operation unit enables the hybrid device to support installing and loading of third party applications and application-specific data to the secure element by the end user.

In the passive state, the active operation unit is deactivated, and/or decoupled with external power source, and the passive operation unit is activated/configured to enable the hybrid device to function as a passive device and adapted for various operations requiring a relatively low or transient power consumption, among other, conducting data verification and/or contactless data transaction operation via the secure element, wherein the low or transient operating power could be drawn from a predetermined matching device adapted for working with a passive device.

In some embodiments such as the embodiment as shown in the FIG. 8, while in the active state the active operation unit 11010 is activated by operatively coupled with and powered by a power transfer unit 11060 for conducting wireless data communication with a provisioning unit, such as a dedicated machine, or a computer, a smart or mobile device comes with a dedicated module for provisioning data to the secure element 11020, whereby enabling the provisioning of the personalization information or the like and/or the token of the device to the secure element from the provisioning unit.

In some embodiment such as the embodiment as shown in the FIG. 8, while in the passive state the passive operation unit 11030 is activated by operatively coupled with and wirelessly powered by a data transaction unit 11050, such as a dedicated machine terminal, or a computer, a smart or mobile device comes with a dedicated module for contactless payment transaction with the secure element 11020, whereby enabling the conducting of data verification and/or contactless data transaction operation with the payment transaction unit via the secure element.

Figure 9:
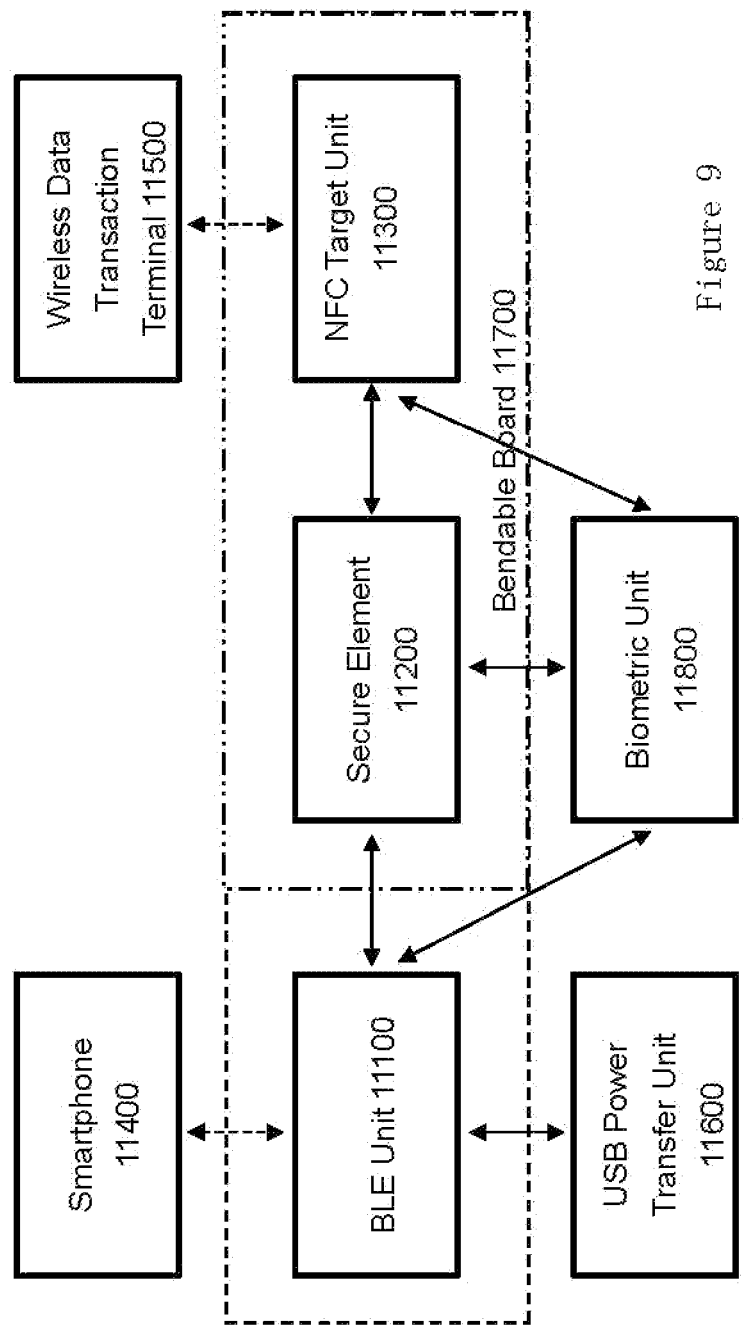
FIG. 9 is a block diagram of a battery-less active and passive hybrid device according to yet still another preferred embodiment of the present disclosure.

Now referring to FIG. 9, a block diagram of a battery-less active and passive hybrid device according to another preferred embodiment of the present disclosure is illustrated, according to which the hybrid device adapted for various secure applications/operations/communication comprises a secure element 11200 adapted for storing at least one secure applet for conducting various secure applications/operations and at least one data segment/memory for secure contactless data transaction/exchange and operatively connected with a BLE enabled active operation unit and a NFC enabled passive operation unit. The present embodiment is similar to the one as shown in FIG. 5 in structural, operational, and functional aspects, while the present embodiment and the embodiments as shown in FIGS. 1-2 and FIGS. 4-5 differ basically in that it further comprise a biometric unit 11800 for secondary or biometric authentication of user identity comprising one or more biometric readers/sensors capable of reading, writing and processing biometric data related to vein pattern, fingerprints, hand geometry, DNA, voice pattern, iris pattern, signature dynamics and/or face detection. The biometric unit 11800 is operatively connected with the secure element 11200, the BLE unit 11100, and the NFC target unit 11300 as shown in the figure. Definitely and apparently, the biometric unit could be also incorporated by and for use with all of the above embodiments in a similar manner.

In some embodiments such as the embodiment as shown in the FIG. 9, the active operation unit is a BLE unit 11100 comprising a plurality of contacts for receiving power from removably coupled power transmitter and the power transfer unit is a USB power transfer unit 11600 comprising a USB power transmitter, preferably equipped with connection members, such as connection pins or hooks, and/or fixing or locking members for making contact and/or interlocking with the contacts of the BLE unit, whereby providing the power to the BLE unit for conducting wireless data communication with a provisioning unit, namely a smartphone 11400 as shown in the FIG. 9. The passive operation unit is a NFC passive target unit 11300 operatively coupled with and wirelessly powered by a payment transaction unit, namely a wireless data transaction terminal 11500, and configured to draw its operating power from the payment transaction unit acting as a NFC initiator unit for conducting data verification and/or contactless data transaction operation with the data transaction terminal via the secure element 11200.

Further, in the hybrid device as shown in FIG. 9, the secure element 11200, the BLE unit 11100, and the NFC passive target unit 11300 are operatively coupled with each other and mounted on a bendable board 11700 adapted for easy mounting on a non-planar or a curved surface and/or being readily insertable or embedded into a curved accommodating space. In some embodiments, the biometric unit 11800 is also operatively coupled with the secure element 11200, the BLE unit 11100, and the NFC passive target unit 11300 and mounted together with them on the bendable board 11700. Alternatively, the BLE unit is adapted to be removably connected with the secure element without mounting fixedly on the bendable board; and/or the BLE unit might be integrated with the USB power transfer unit 11600, similar to the foregoing embodiments.

In some embodiments, the hybrid device is mounted at and preferably embedded into a band or buckle, preferably made of a non-metal material such as leather or plastic or the like to reduce the interference thereof, of a traditional watch to replace the original band or buckle of the watch of a user for conducting contactless data transactions and other applicable operations making use of biometric data, health data, hardware specific data, and/or Government related security data and the like, such that the user could wear and use the watch in a traditional way while benefit from the contactless secure data communication/processing capabilities provided by the new and replaceable part of the watch.

Figure 10A:
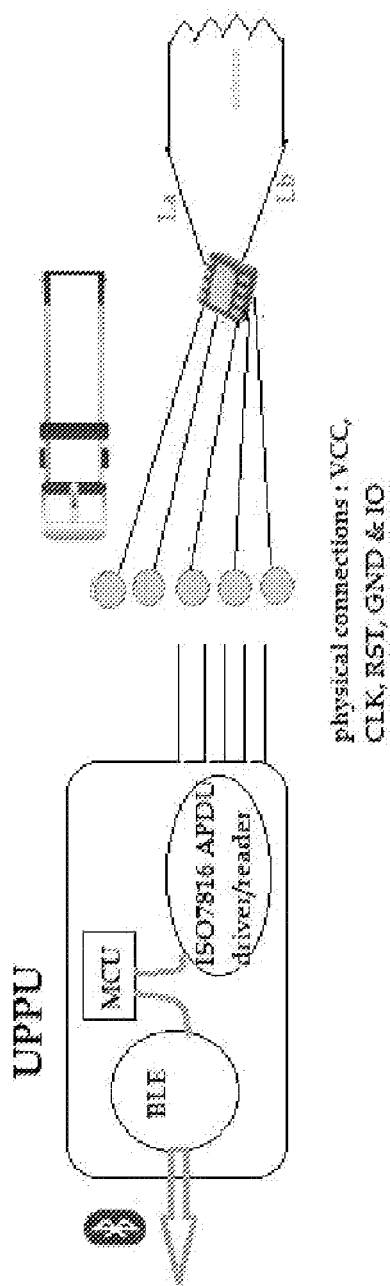
FIG. 10a is a schematic view of an universal passive provisioning unit adopted by the battery-less active and passive hybrid device according to one preferred embodiment of the present disclosure.
Figure 10B:
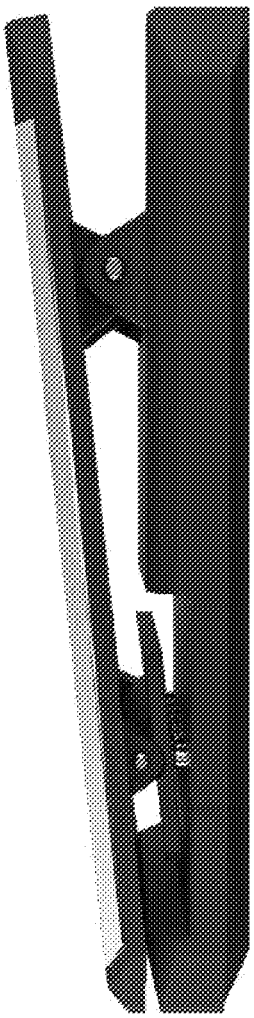
FIG. 10b is a schematic view of a clip type universal passive provisioning unit adopted by the battery-less active and passive hybrid device according to another preferred embodiment of the present disclosure.

Referring to FIGS. 10*a*-10*b*, schematic views of an universal passive provisioning unit or the active operation unit adopted by the battery-less active and passive hybrid device according to one preferred embodiment of the present disclosure are illustrated, wherein the active operation unit is integrated with the power transfer unit and/or an interface for power transfer to form an universal passive provisioning unit being substantially in form of a clip/clamp or a forepart of clothes-pin and adapted for provisioning various matched and compatible smart wearables of various forms and dimensions (such us a wristband or a watch band of various dimensions as described above). The power transfer unit/the interface for power transfer of the embodiment is a USB power transmitter or a USB interface/cable with ends connected respectively with a USB power socket (e.g. the power socket on a smartphone, or a mobile device, a computer, or the like) and a proximal end (such as the rightmost end in the figure) of the universal passive provisioning unit. The universal passive provisioning unit comprises a BLE controller/unit and a ISO7816 type APDU driver/reader unit operatively connected with a MCU, which comes with a plurality of connection pins, such as 5 connection pins (namely the VCC, CLK, RST, GND, and 10 pins) as shown in the FIG.

10*a*, for enabling a detachable connection and communication with the secure element and NFC unit mounted on a passive bendable board embedded or mounted into a smart wearable device, such as a wristband or watch band with 5 contacts as shown in the FIG. 10*a*. The connection pins of the universal passive provisioning unit are adapted for engaging or coupling with the 5 contacts for provisioning one or more personalization information data, biometric data, health data, government related security data, hardware specific data, and/or a token of the device to the secure element. After provisioning process, the universal passive provisioning unit will be disengaged with the bendable board, such that the passive bendable board is now adapted and suitable for conducting data verification and/or contactless data transaction operation with dedicated terminal or conventional POS terminals via the secure element.

Referring to FIG. 10*b*, the universal passive provisioning unit substantially in the form of a clip/clamp or a forepart of clothes-pin and adapted for provisioning various matched and compatible smart wearables of various forms and dimensions (such us a wristband or a watch band of various dimensions as described above and shown in the figure) is depicted, which is similar to the power transfer unit shown in FIGS. 6-7 in terms of their appearance and also comprises a lower part with a flattened portion located at its proximal end and a depressed portion at its distal end on which a plurality of connection members are arranged for enabling power and signal transmission; and an upper part hingeably mounted over the lower part and configured to be switchable between an opened position/state in which its proximal end is configured to make contact with the proximal end of the lower part and its distal end is configured to disengage with the distal end of the lower part, such that the connection members and depressed portion are accessible to receive at least partly a respective external engageable passive member (such as a wristband or a watch band as described above and shown in FIG. 10*b*) comprising the secure element and passive operation unit adapted for conducting power and data transmission or operation therebetween, such as operation for provisioning of personalization information data, biometric data, health data, government related security data, hardware specific identification data, and/or a token of the device; and a closed position/state (the position as shown in FIG. 10*b*) in which its distal end is configured to make contact with the distal end of the lower part and its proximal end is configured to disengage with the proximal end of the lower part, such that the connection members and depressed portion are covered by the upper part and the engaged passive member is sandwiched between and locked by the upper and lower parts for facilitating the power and data transmission or operation therebetween. As can be seen from the figure, an optional protrusion extended in a width direction is arranged at the bottom side of the upper part and positioned at a location corresponding to the same of the connection members arranged at the lower art, so as to act as an optional fixing or locking member for facilitating or securing the engagement between the universal passive provisioning unit and the passive member, as shown in the FIG. 10*b*. After completion of the power and data transmission or operation, such as operation for provisioning, the upper part might be hinged or switched to the opened position/state and the provisioned passive member could be removed from the depressed portion and is made ready and configured for conducting data verification and/or contactless data transaction operation with dedicated terminals or conventional terminals, such as a NFC POS terminal, via the secure element.

Figure 11A:
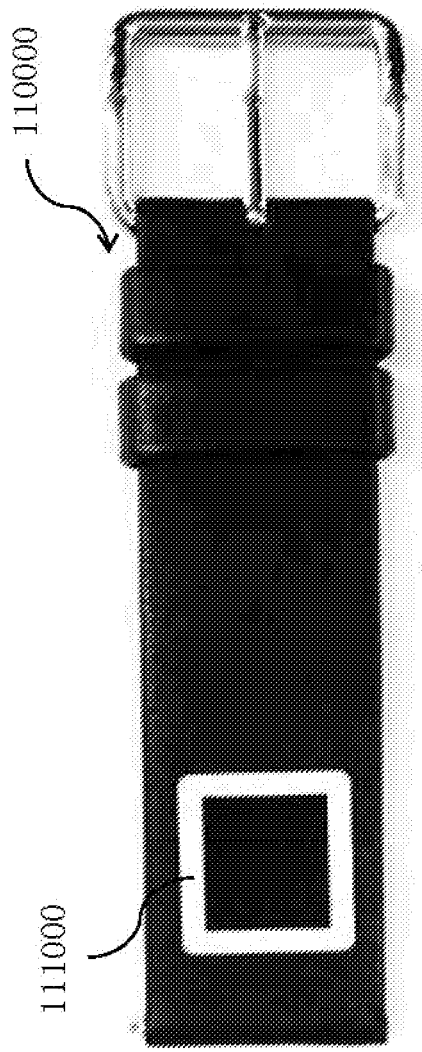
FIG. 11a is a schematic view of a watch band adopting a biometric enabled wireless secure payment and/or data transaction apparatus according to one preferred embodiment of the present disclosure.

Now referring to FIG. 11*a*, a schematic view of a watch band 110000 adopting a biometric enabled wireless secure payment and/or data transaction apparatus 111000 according to one preferred embodiment of the present disclosure is illustrated. The biometric enabled wireless secure payment and/or data transaction apparatus is mounted on or embedded at least partially in the watch band and configured to play the role of a biometric enabled wearable payment, access and digital authentication device and the biometric unit incorporated therewith is configured to enable biometric authentication in a range of form factors/items, such as watches/watch bands, bracelets, jewellery, fitness bands and many other kinds of accessories, and instantly transforming those items into payment and access devices, wherein such devices are capable of providing the highest level of security for payments and transactions by achieving global EMV Standards. In some embodiments, the biometric enabled wireless secure payment and/or data transaction apparatus is positioned adjacent to or as close as possible to the watch dial to minimize any possible RF-interference with RF components of the watch; and/or the watch band is made of silicone and/or leather to minimize any possible RF-interference.

Figure 11B:
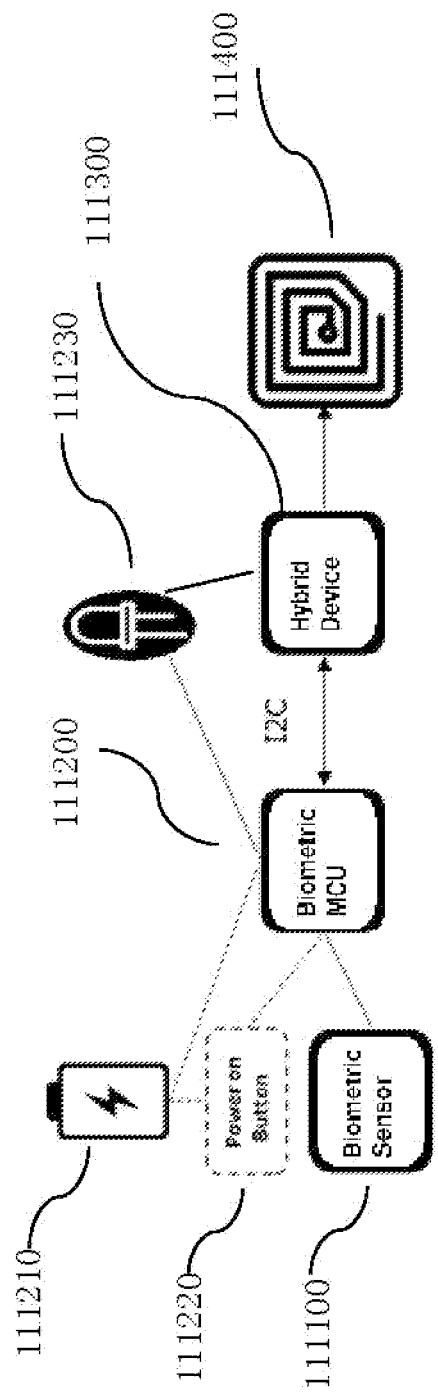

Referring to FIG. 11*b*, a schematic block diagram of the biometric enabled wireless secure payment and/or data transaction apparatus of FIG. 11*a* is depicted. The biometric enabled wireless secure payment and/or data transaction apparatus comprises a biometric unit (or a finger print processing unit, as depicted in the present embodiment) including a biometric sensor 111100 (or a finger print sensor, as depicted in the figure) connected with a biometric MCU 111200 (or a finger print MCU, as depicted in the figure); a foregoing active and passive hybrid device 111300 comprising a secure element integrated or connected with a wireless communication unit (preferably a NFC enabled communication unit) and an antenna unit 111400; wherein various components of the biometric enabled wireless secure payment and/or data transaction apparatus are operably connected for conducting preset operations. In some embodiments, the biometric MCU and the hybrid device, and particularly the secure element are connected via Inter-Integrated Circuit (I2C) interface/protocol.

In some embodiments, the biometric enabled wireless secure payment and/or data transaction apparatus further comprises a battery unit 111210 (preferably a micro battery, more preferably a one-off micro battery requiring no recharging capability), a power switch unit 111220 (preferably a power on button), and a visual and/or audible indicator unit 111230 (preferably a LED indicator unit comprising at least one LED and/or an audio device comprising a beeper and/or a speaker (not shown)) operably connected with each other and further connected with the finger print MCU respectively. The battery unit is configured to power the biometric unit once activated via the power switch unit to enable manipulation of biometric data and data communication among the biometric unit and the hybrid device, particularly the secure element thereof, for conducting predetermined operations for payment, access and digital authentication; wherein the biometric unit is configured to collect a biometric data from the biometric readers/sensors and compare it with a pre-stored user identity/specific biometric data to generate a result of comparison and to determine whether the secure element needs to be operated for conducting secure payment or data transactions and to control an output of the visual and/or audible indicator unit to provide a proper or corresponding visual and/or audible indication for the result of comparison and/or latest status of secure payment or data transactions.

In some embodiments, the battery unit is non-rechargeable and non-replaceable and could be used for several thousand times (e.g. >3000 times) or a period conformed with the lifetime of a conventional credit card; and/or the power switch unit or the power on button is positioned underneath the finger print sensor and/or the finger print MCU finger print sensor such that the finger print of the user could be instantly scanned while activating the biometric enabled wireless secure payment and/or data transaction apparatus with the user finger.

In other embodiments, the biometric enabled wireless secure payment and/or data transaction apparatus is dispensed with the power switch unit and the battery unit, namely the one-off battery, and the finger print MCU and the finger print sensor are activated by a nearby RF field or a signal received from the antenna unit of the hybrid device, which means the finger print the finger print MCU and/or the finger print sensor are devised and acted as passive devices and could be activated via a nearby POS terminal, for example.

In several embodiments, the LED indicator unit is configured to change or switch its color to a preset color for providing proper or corresponding indication for validity of user identity authentication or latest status of operation of the wireless secure payment and/or data transaction apparatus. For example, it will emit green light when the authentication is passed and red light if the authentication is failed. Further, the biometric enabled wireless secure payment and/or data transaction apparatus might be provisioned with a plurality of credit card numbers or relevant tokens; and then the LED indicator unit might display a first color to represent a default/first credit card/token (e.g. a VISA card issued from a first bank) and emits a second color when a second credit card/token (e.g. a MasterCard card issued from a second bank) is selected by the user to conduct a desired payment/data transaction. In addition, finger print enrollment could be conducted for one or more user fingers. During the enrollment process, the biometric enabled wireless secure payment and/or data transaction apparatus might be entered into an "enrollment mode", which might be indicated with a flashing operation of the LED indicator unit and the enrollment process might be also facilitated or guided via the various operations of the LED indicator unit.

Figures 12A, 12B:
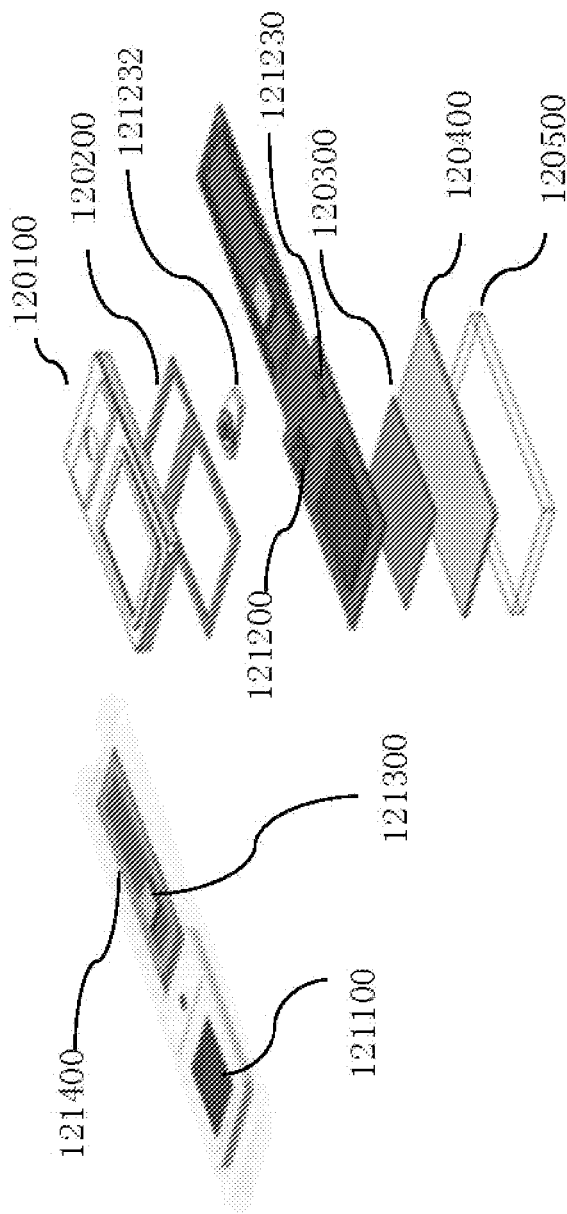
FIGS. 12a-12b are respectively a perspective view and exploded view of an example biometric enabled wireless secure payment and/or data transaction apparatus according to a preferred embodiment of the present disclosure.

Now referring to FIGS. 12a-12b, a perspective view and an exploded view of an example biometric enabled wireless secure payment and/or data transaction apparatus according to a preferred embodiment of the present disclosure are illustrated respectively. The biometric enabled wireless secure payment and/or data transaction apparatus is embedded or concealed at least partly in a wearable, such as a watch band, and it comprises a biometric unit (or a finger print processing unit, as depicted in the present embodiment) including a finger print sensor 121100 connected with a finger print MCU121200; a foregoing hybrid device 121300 comprising a secure element and a NFC driver or NFC enabled communication unit connected with an antenna unit 121400 for NFC operations; wherein various components of the biometric enabled wireless secure payment and/or data transaction apparatus are operably connected for conducting preset data and payment transactions/operations in response to respective user operations.

As depicted in the figure, the example biometric enabled wireless secure payment and/or data transaction apparatus is compact in size, and preferably might be of a dimension of 60.70 mm×17.60 mm×1.60 mm, and comprises a epoxy layer/plate 120500 acting as a basal plate, on which an optional battery 120400, and preferably a flexible battery, is arranged for powering the wireless secure payment and/or data transaction apparatus as required for conducting specific operations, such as data provisioning operations and biometric data enrollment operations requiring a substantial amount of power. A first or lower adhesive pad is positioned between the battery and a PCB or main board for ensuring the proper positioning thereof. The main board includes the finger print sensor 121100, the finger print MCU121200; a LED indicator 121230 accompanied with a light guide 121232, and the hybrid device 121300 with the secure element mounted thereon via surface mount technology, wherein the finger print sensor 121100, the finger print MCU121200 are mounted at the proximal end, while the hybrid device 121300 and the antenna unit 121400, preferably of a size of 30 mm×11 mm, are mounted at distal end of the main board. A second or upper adhesive pad is placed to ensure a proper positioning of the main board and a plate holding, preferably made of 0.15-mm thick stainless steel plate. The example biometric enabled wireless secure payment and/or data transaction apparatus is bendable for easy insertion into a traditional wearable requiring the capability of performing wireless secure payment and/or data transaction.

In some embodiments, the biometric enabled wireless secure payment and/or data transaction apparatus is configured to conduct a process for finger print enrolment, wherein one or more fingers could be enrolled, such as the thumb, the index finger, middle finger, and so on. The process comprises an activation step in which the user presses the finger print sensor and the button underneath with respective fingers to activate the finger print sensor and the finger print MCU after setting and switching them or the wireless secure payment and/or data transaction apparatus from an "un-enrolled" or "normal" mode into an "enrollment mode"; an enrollment step in which the user places the respective fingers on the finger print sensor for several times to gather and determine a complete finger print data associated with the finger, wherein the visual and/or audible indicator unit, such as a LED indicator, will guide user throughout the process. For example, a static red light might means "ready to place/scan finger", a flash red light might means "lift finger for the next placement" and a green light might means the completion of enrollment for the respective fingers.

The process further comprises a completion step, wherein after repeating/completing the enrollment process for the one or more fingers, the wireless secure payment and/or data transaction apparatus will be fully enrolled and power down after setting and switching it from the "enrollment mode" into the "normal" mode adapted for effecting secure payment and/or data transactions.

In this regard, on the next activation of the wireless secure payment and/or data transaction apparatus, it will be entered into the "normal" mode ready for transactions.

After finger print data are enrolled in the wireless secure payment and/or data transaction apparatus embedded into a wearable, the user might presses finger print sensor and the button underneath to draw power from the battery unit to activate biometric MCU and secure element or they could be activated by a nearby RF source. For example, the user might holds the wearable over an EMV contactless POS terminal, the power from RFID captured by antenna unit activates biometric MCU and secure element. After the user puts finger on the finger print sensor to capture image of the finger, finger print data is processed and compared, and a match result will be ready within 1 second. The finger print match result will be sent to the payment application in the secure element. If the authentication is successful, the payment transaction can be completed. If the authentication is not successful, the consequence shall be depending on the configuration preset by the issuer or provider of wireless payment system. In general, the payment or data transaction can be completed within 1 second to provide an optimized user experience.

Figure 13:
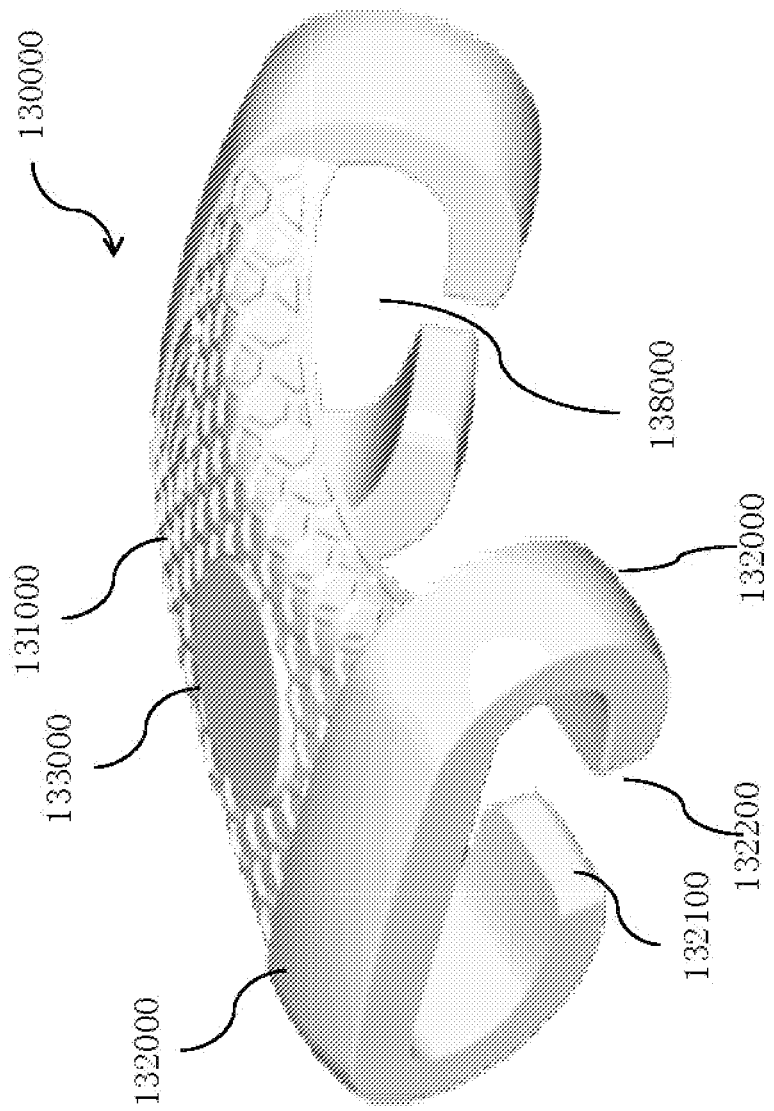
FIG. 13 is a schematic view of a clasp device adapted for use with a wearable for conducting wireless secure payment and/or data transaction apparatus according to one preferred embodiment of the present disclosure.
Figure 13B:
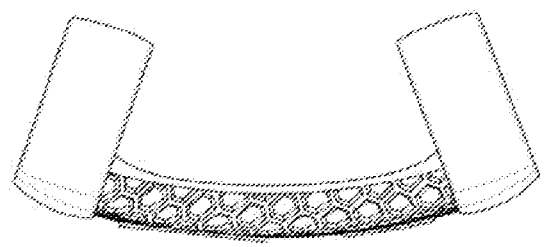
FIGS. 13a and 13b are respectively the front view and lateral view of the clasp device of FIG. 13.
Figure 13A:
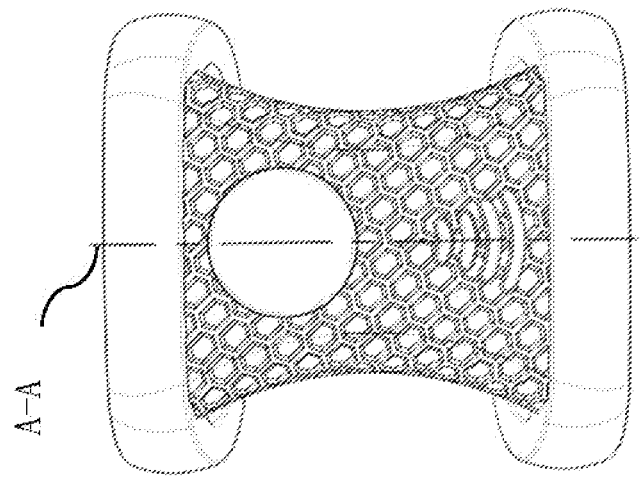

Referring to FIG. 13, a schematic view of a clasp device 130000 adapted for use with a wearable for conducting wireless secure payment and/or data transaction apparatus according to one preferred embodiment of the present disclosure is shown, while FIGS. 13a and 13b have respectively depicted the front view and lateral view of the clasp device. According to the embodiment, the clasp device 130000, is preferably adapted for use with a wearable device (such as a watch, a watch band, a bracelet, a lanyard, or the like) and/or substantially in the form of an IC chip having an elongated main body and at least one leg extended from the main body, comprising a main portion 131000, preferably configured to be resiliently bendable and/or deformable in its height direction, length direction, and/or width direction, and at least one resiliently bendable and/or deformable locking/mounting/engaging leg/arm or end 132000 extended from the main portion along a curvature and configured to be switchable between a normal state and transient deformed state; wherein in the normal state a free end 132200 of the deformable arm/end is separated from an opposed end 132100 of the main portion a first distance and configured to form a first cavity or passage 138000 with the main portion for receiving/locking or engaging with an external wearable device (preferably an engageable portion of an associated wearable device, such as a watch band of a watch, a lanyard of an accessory including mobile phone, card holder, keychain, and the like) and mounting the clasp device in place (and preferably on the wearable device, such as a watch, a bracelet, lanyard, or the like); while in the deformed state the free end of the deformable arm/end is resiliently deformed to enable it to be separated from the opposed end of the main portion a second distance relative large in magnitude than the first distance and configured to form (preferably by expanding temporarily the first cavity or passage into to) a deformable second cavity or passage, having an enlarged dimension than the first cavity or passage, with the main portion for enabling insertion or removal of the external wearable device (preferably the engageable portion of the associated wearable device) into or from the first cavity or passage.

Though the clasp device shown in the figure has two pairs of opposed ends or four deformable free ends (132100, 132200), the person skilled in the art will readily appreciate that the clasp device might have only one deformable free end, wherein an opposed end or an opposed edge could be arranged at the left hand side (the side denoted by 132100 as in FIG. 13) of the main portion; and wherein the opposed end or edge might be rigid or inflexible in nature and the single deformable free end (such as 132200) might be arranged at the middle position or a preset position at the right hand side preferably along the length direction of the clasp device and separated from the opposed end or edge the first distance. In operation, an adequate pulling force might be applied by an operator toward the free end (such as the end denoted by 132200) to make it move or deform (and in some case rotate) along a curvature in an anticlockwise direction (or a clockwise direction if the deformable end is arranged at the left hand side, as denoted by the end 132100) to enlarge the gap or the first distance to the second distance or to such an extent that an engageable portion or component of an associated wearable device could be inserted into or removed from the cavity or passage delimited by the main portion and the free end as well as the opposed end or edge via the deformation initiated by the force exerted on the deformable end by the operator during engaging or disengaging the clasp device with or from the associated wearable device. The adequate force might refer to a force with an adequate magnitude which on one hand ensures a proper desirable deformation of the free end, which on the other hand is relatively large than an unintentional force exerted occasionally to the deformable free end during daily usage of the clasp device and/or the wearable device engaged therewith, so as to prevent unintentional disengagement or removal of the claps device from the wearable device. This might be done at least partially by forming a clasp portion and/or the main portion, and/or free end(s) of the clasp device with a selected deformable material having a desirable flexibility and durability, as will be described in further details below.

In some embodiments, the foregoing clasp device might further comprise an UPPU or a battery-less active and passive hybrid device for secure wireless data transaction and particularly for secure contactless payment as described above, which basically comprises a secure element adapted for storing at least one secure applet and at least one data segment for secure contactless data transaction and operatively connected with an active operation unit and a passive operation unit; and preferably the active operation unit is adapted to be connected removably with the secure element; and wherein the hybrid device is configured to be switchable between an active state in which the active operation unit is activated on demand to enable the hybrid device to function as an active device and adapted for provisioning one or more personalization information data, biometric data, health data, government related security data, hardware specific data, and/or a token of the device to the secure element; and a passive state in which the active operation unit is deactivated and the passive operation unit is activated/configured to enable the hybrid device to function as a passive device and adapted for conducting data verification and/or contactless data transaction operation via the secure element.

In several embodiments, the clasp device comprises the main portion and a plurality of resiliently bendable and/or deformable arms or ends (such as four deformable arms or ends as depicted in FIGS. 13, 13a, and 13b) extended from the main portion along a curvature and each of them being configured to be switchable between a normal state and transitional deformed state; wherein in the normal state the free end of respective deformable arms/ends are opposed to and separated from each other a first distance and configured to form a first cavity or passage with the main portion for receiving/locking or engaging with an external wearable device (preferably at least one engageable portion of an associated wearable device) and mounting the clasp device in place (and preferably on a wearable device, including a watch and a bracelet), to convert the wearable device into a smart wearable device capable of performing secure data transaction and/or wireless secure payment; while in the transitional deformed state the free end of at least one of the deformable arms/ends is deformed to enable it to be opposed to and separated from another one of the deformable arms/ends a second distance and configured to form (preferably by expanding temporarily the first cavity or passage into to) a deformable second cavity or passage with the main portion for enabling insertion or removal of the external wearable device (preferably the engageable portion of the associated wearable device) into or from the first cavity or passage.

In other embodiments, the main portion is configured to be preferably an elongated and curved member having a first internal/external curvature in its length direction (which might parallel to the center line or plane as denoted by A-A in FIG. 13a) and a second internal/external curvature in its width direction, wherein the first and second internal curvatures are configured to form collectively an internal surface adapted for conforming with an outer profile of an associated wearable device to be mounted to facilitate proper mounting of the apparatus over the wearable device; and the first and second external curvatures are configured to form collectively an external surface adapted for incorporating/providing a data access region/zone (such as the region denoted by 133000) over a secure element received therein for facilitating a wireless data sensing operation of and/or a data exchanging operation with an external associated device/terminal to enable a proper interaction between the wearable device and the associated device/terminal. In some embodiment, the region/zone denoted by 133000 could be provided with a label or a window with a visual or audio indicator for proper identification of the property, such as the nature, manufacturer, model number, and/or various data including current operation mode/information/alert, of the clasp device.

In further embodiments, the deformable arm or end is arranged on or integrated with a clasp portion (such as 132000) connected or integrated with the main portion, wherein the clasp portion is preferably an elongated and curved member having a first internal/external curvature in its length direction orthogonal to the width direction of the main portion and a second internal/external curvature in its width direction orthogonal to the length direction of the main portion, wherein the first and second internal curvatures are configured to form collectively an internal surface adapted for conforming with an outer profile of the wearable device to facilitate proper mounting of the clasp device over the wearable device; and the first and second external curvatures are configured to form collectively an external surface adapted for facilitating a proper mounting of the clasp device over the wearable device. In some embodiments, the foregoing curvature might be zero or nearly zero if an engageable portion of an associated wearable device has a plain outer surface.

As shown in the figure, the clasp portion might have a substantially c-shaped sectional shape in a plane perpendicular to a length direction of the clasp device.

In some embodiments, the first distance might be zero or nearly zero if an engageable portion of an associated wearable device is small in size/thickness; and/or the clasp portion might have a substantially oval or running-track-shaped sectional shape in a plane perpendicular to a length direction of the clasp device. Preferably, both the first distance and the second distance might be devised or determined based on a thickness and/or width of a desired engageable portion of an associated wearable device. For example, if the engageable portion is in the form of a loop or flat band of a small diameter or thickness in the scale of mm, both the first distance and the second distance might be also in mm or nearly zero, and the respective sectional area/volume of the first and second cavities of the clasp device might be devised to be in the scale of $mm^2$-$cm^2$/$mm^3$-$cm^3$.

In several examples, the clasp portion comprises two opposed deformable ends extended in a curved direction or along the first internal/external curvature substantially in its length direction from a distal side to a proximal side of the clasp device to form a cavity for receiving an elongated portion of the wearable device to facilitate proper mounting of the apparatus over the wearable device.

In some embodiments, the deformable end is configured to be switchable between a contracted state in which the clasp portion has a shortest length and is adapted for coupling or engaging with a wearable device and an expanded state in which the clasp portion has a longest length and is adapted for decoupling or disengaging from an engaged wearable device or easy insertion of a wearable device to be engaged therewith.

According to an embodiment of the present disclosure, the main portion and the clasp portion might collectively have a substantially c-shaped/oval sectional shape in a plane perpendicular to a length direction of the clasp device to facilitate proper mounting of the apparatus over the wearable device.

According to further embodiments of the present disclosure, the main portion, the clasp portion, and/or the deformable arm/end comprise an inner layer made of 65 manganese steel preferably formed by stamping to provide a desired resilience, flexibility and/or durability, and/or an outer layer made of thermoplastic polyurethanes preferably formed by injection to provide a desired insulation/screening effect (e.g. to minimize possible metallic interference during wireless communication for payment), texture, flexibility and/or durability.

Figures 14A, 14B:
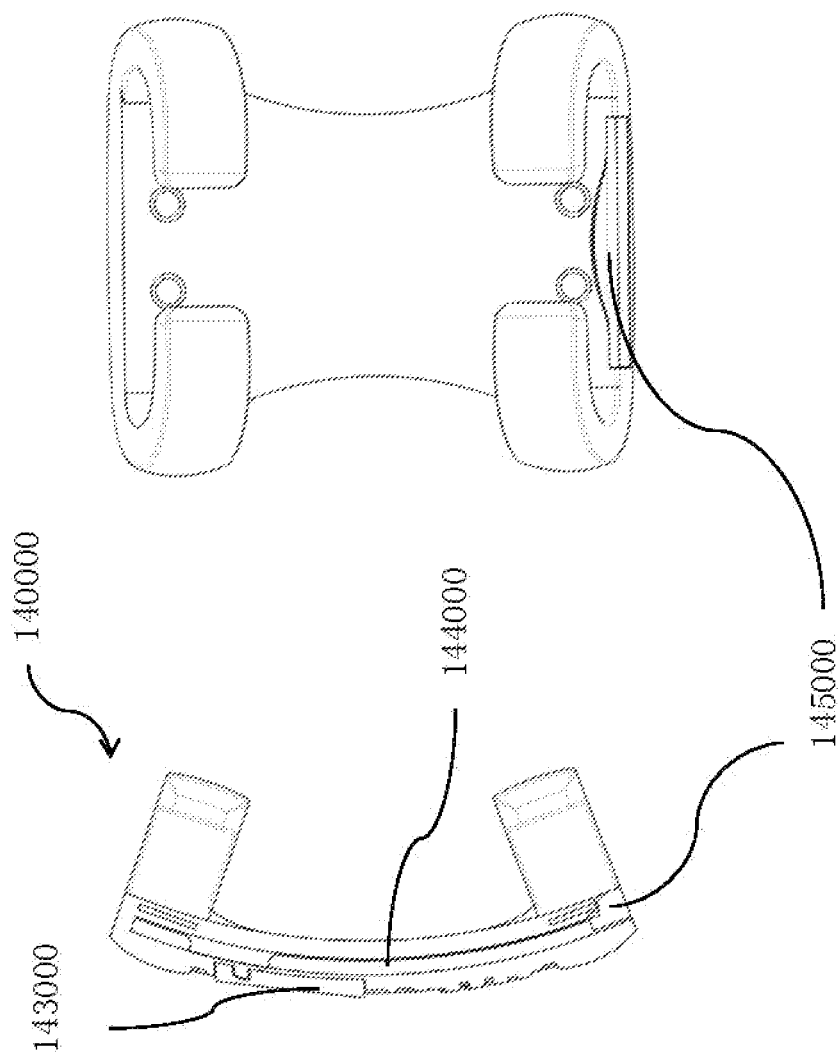
FIGS. 14a-14b are respectively a sectional view and a back view of an example clasp device according to a further preferred embodiment of the present disclosure.

Now referring to FIGS. 14a-14b, a sectional view and a back view of an example clasp device 140000 according to a further preferred embodiment of the present disclosure are respectively depicted. As shown in the FIG. 14a, the secure element and/or an associated bendable board (such as the one denoted by 11700) might be received or arranged in a cavity or accommodating space 144000 formed inside the clasp device substantially in the form of a IC chip, and the region/zone 143000 might be arranged on a dedicated position on the main portion or over a specific portion of the secure element and/or the associated bendable circuit board for facilitating and ensuring proper wireless data transaction or contactless payment operations between the clasp device and a corresponding matching device or terminal. A slot of the clasp device or an open end of the cavity or accommodating space 144000 might be engaged or sealed with a plug 145000 which might be a non-conductive and flexible sealing plug to reduce interference, and they might be interconnected or engaged firmly with each other via an interference or tight fit.

Figure 14D:
FIGS. 14c-14d are respectively a side view and a perspective view of an example clasp device mounted on an example wearable according to a further preferred embodiment of the present disclosure.
Figure 14C:
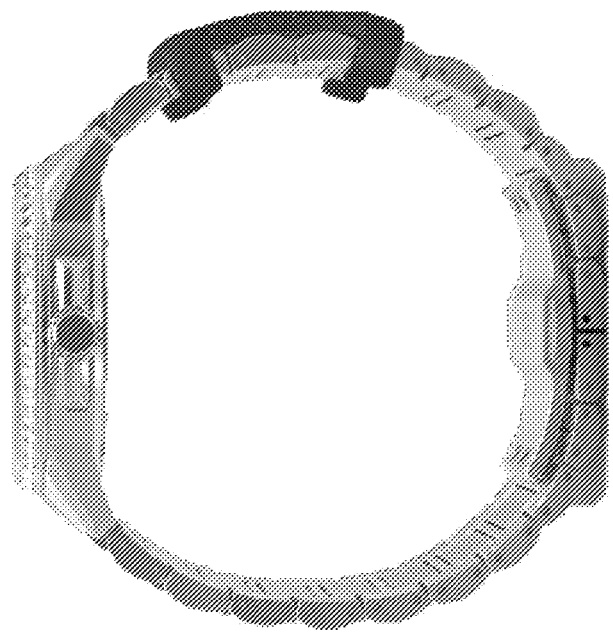

Now referring to FIGS. 14c-14d, a side view and a perspective view of an example clasp device mounted on an example wearable according to a further preferred embodiment of the present disclosure are respectively depicted. As shown in the FIGS. 14c-14d, the wearable is a traditional analog watch without wireless payment capability, and the clasp device is mounted firmly on the watch band at an upper portion preferably adjacent to the watch case. The clasp device is configured to be resiliently bendable and/or deformable in its height direction (the shortest dimension as depicted in the figure), length direction (the longest dimension), and/or width direction, and comprises two pairs of resiliently bendable and/or deformable legs/arms extended from the main portion along a curvature conforming the same of the wrist of the user or the watch band and configured to be switchable between a normal/mounted state as depicted and a deformed state. In the normal mounted state the free ends of the pair of deformable legs/arms are separated from each other a first distance and configured to form a first cavity or passage for receiving or engaging with the engageable portion, namely the watch band of the watch, whereby mounting the clasp device in place at the watch. In the deformed state (not shown) a free end of the deformable leg/arm is resiliently deformed by a force exerted by the user to enable it to be separated from its opposed end a second distance relative large in magnitude than the first distance, such that the first cavity or passage is expanded temporarily and transformed into to a deformable second cavity or passage, having an enlarged dimension than the first cavity or passage, which is adapted for enabling easy insertion or removal of the engageable portion of the associated wearable device, namely the watch band of the watch, into or from the receiving cavity or passage defined by the clasp device. The depicted clasp device is small in size, and it might have a length of 30 mm or below, a width of 26 mm or below, and a height of 12.5 mm or below; and the exact dimension is mostly depending on the same of the engageable portion of the associated wearable device. As depicted, the dimension, appearance, contour and/or texture of the clasp device might be devised to conform to the same of the engageable portion of the associated wearable device to enhance operationality, comfort of wearing, and aesthetic perception thereof. Owing to the employment of a selected deformable material having a desirable flexibility and durability such as an inner layer of material comprising 65 manganese steel and an outer layer of material comprising thermoplastic polyurethanes, the clasp device could be manipulated/deformed for engaging/disengaging with the associated wearable device at least for several thousand times. In other words, the clasp device might be switchable between the normal state for fixation with an associated wearable device as depicted for conducting desired wireless data transaction and the deformed state for receiving/disengaging with an associated wearable device for adding/removing the wireless data transaction capability to/from a traditional wearable device at least for several thousand times during its lifespan.

The present disclosure is described according to specific embodiments, but those skilled in the art will appreciate that various changes and equivalents might be made without departing from the scope of the present disclosure. In addition, many modifications might be made to the present disclosure without departing from the scope of the invention in order to adapt to specific circumstances or components of the present disclosure. Accordingly, the present disclosure is not limited to the specific embodiments disclosed herein, and shall include all embodiments falling within the scope of the claims.

The invention claimed is:

1. A clasp device, preferably adapted for use with a wearable device, comprising:
   a main portion, preferably configured to be resiliently bendable and/or deformable in its height direction, length direction, and/or width direction; and
   at least one resiliently bendable and/or deformable arm or end extended from the main portion along a curvature and configured to be switchable between a normal state and a deformed state;
   wherein in the normal state a free end of the deformable arm/end is separated from an opposed end of the main portion a first distance and configured to form a first cavity or passage with the main portion for receiving/locking or engaging with an external wearable device, preferably an engageable portion of an associated wearable device, and mounting the clasp device in place, and preferably on the wearable device including a watch and a bracelet;
   while in the deformed state, the free end of the deformable arm/end is resiliently deformed to enable it to be separated from the opposed end of the main portion a second distance relative large in magnitude than the first distance and configured to form by expanding temporarily the first cavity or passage into, a deformable second cavity or passage, having an enlarged dimension than the first cavity or passage, with the main portion preferably for enabling insertion or removal of the external wearable device, preferably the engageable portion of the associated wearable device, into or from the clasp device;
   wherein the deformable arm or end is arranged on or integrated with a clasp portion connected or integrated with the main portion, wherein the clasp portion is preferably an elongated and curved member having a first internal/external curvature in its length direction orthogonal to the width direction of the main portion and a second internal/external curvature in its width direction orthogonal to the length direction of the main portion, wherein the first and second internal curvatures are configured to form collectively an internal surface adapted for conforming with an outer profile of a wearable device to facilitate proper mounting of the clasp device over the wearable device; and the first and second external curvatures are configured to form collectively an external surface adapted for facilitating a proper mounting of the clasp device over the wearable device.

2. The clasp device of claim 1, further comprising a battery-less active and passive hybrid device for secure wireless data transaction comprising a secure element adapted for storing at least one secure applet and at least one data segment for secure contactless data transaction and operatively connected with an active operation unit and a passive operation unit; and preferably the active operation unit is adapted to be connected removably with the secure element; and wherein the hybrid device is configured to be switchable between an active state in which the active operation unit is activated on demand to enable the hybrid device to function as an active device and adapted for provisioning one or more personalization information data, biometric data, health data, government related security data, hardware specific data, and/or a token of the device to the secure element; and a passive state in which the active operation unit is deactivated and the passive operation unit is activated/configured to enable the hybrid device to function as a passive device and adapted for conducting data verification and/or contactless data transaction operation via the secure element.

3. The clasp device of claim 1, wherein the clasp device comprises the main portion and a plurality of resiliently bendable and/or deformable arms or ends extended from the main portion along a curvature and each of them being configured to be switchable between a normal state and a deformed state; wherein in the normal state the free end of respective deformable arms/ends are opposed to and separated from each other a first distance and configured to form a first cavity or passage with the main portion for receiving/locking or engaging with an external wearable device, preferably at least one engageable portion of an associated wearable device, and mounting the clasp device in place, and on a wearable device, including a watch and a bracelet, to convert the wearable device into a smart wearable device capable of performing secure data transaction and/or wireless secure payment; while in the deformed state the free end of at least one of the deformable arms/ends is deformed to enable it to be opposed to and separated from another one of the deformable arms/ends a second distance and configured to form, preferably by expanding temporarily the first cavity or passage into to, a deformable second cavity or passage with the main portion for enabling insertion or removal of the external wearable device, preferably the engageable portion of the associated wearable device, into or from the clasp device.

4. The clasp device of claim 1, wherein the main portion is configured to be preferably an elongated and curved member having a first internal/external curvature in its length direction and a second internal/external curvature in its width direction, wherein the first and second internal curvatures are configured to form collectively an internal surface adapted for conforming with an outer profile of an associated wearable device to be mounted to facilitate proper mounting of the clasp device over the wearable device; and the first and second external curvatures are configured to form collectively an external surface adapted for incorporating/providing a data access region/zone over a secure element received therein for facilitating a wireless data sensing operation of and/or a data exchanging operation with an external associated device/terminal to enable a proper interaction between the wearable device and the associated device/terminal.

5. The clasp device of claim 1, wherein the clasp portion has a substantially c-shaped sectional shape in a plane perpendicular to a length direction of the clasp device.

6. The clasp device of claim 1, wherein the clasp portion comprises two opposed deformable ends extended in a curved direction or along the first internal/external curvature substantially in its length direction from a distal side to a proximal side of the clasp device to form a cavity for receiving an elongated portion of a wearable device to facilitate proper mounting of the clasp device over the wearable device.

7. The clasp device of claim 1, wherein the deformable end is configured to be switchable between a contracted state in which the clasp portion has a shortest length and is adapted for coupling or engaging with a wearable device and an expanded state in which the clasp portion has a longest length and is adapted for decoupling or disengaging from the wearable device.

8. The clasp device of claim 1, wherein the main portion and the clasp portion collectively have a substantially c-shaped sectional shape in a plane perpendicular to a length direction of the clasp device to facilitate proper mounting of the clasp device over a wearable device.

9. The clasp device of claim 1, wherein the main portion, the clasp portion, and/or the deformable arm/end comprise an inner layer made of a selected deformable material having a desirable flexibility and durability including 65 manganese steel preferably formed by stamping, and/or an outer layer made of a selected deformable material having a desirable flexibility and durability including thermoplastic polyurethanes preferably formed by injection.

* * * * *